United States Patent
Kuranuki et al.

(10) Patent No.: US 8,248,327 B2
(45) Date of Patent: Aug. 21, 2012

(54) DRIVING DEVICE AND DRIVING METHOD OF PLASMA DISPLAY PANEL, AND PLASMA DISPLAY DEVICE

(75) Inventors: Masaaki Kuranuki, Kyoto (JP); Tosikazu Nagaki, Osaka (JP); Manabu Inoue, Kyoto (JP); Tomohisa Sakaguchi, Kyoto (JP); Kazuo Oohira, Osaka (JP)

(73) Assignee: Panasonic Corporation, Osaka (JP)

( * ) Notice: Subject to any disclaimer, the term of this patent is extended or adjusted under 35 U.S.C. 154(b) by 451 days.

(21) Appl. No.: 12/669,262

(22) PCT Filed: Jul. 18, 2008

(86) PCT No.: PCT/JP2008/001937
§ 371 (c)(1),
(2), (4) Date: Jan. 15, 2010

(87) PCT Pub. No.: WO2009/011136
PCT Pub. Date: Jan. 22, 2009

(65) Prior Publication Data
US 2010/0188387 A1    Jul. 29, 2010

(30) Foreign Application Priority Data

Jul. 19, 2007 (JP) .................................. 2007-187810
Feb. 8, 2008 (JP) .................................. 2008-028791

(51) Int. Cl.
*G09G 3/28* (2006.01)
(52) U.S. Cl. .......................................... 345/60; 345/904
(58) Field of Classification Search .................... 345/60, 345/62, 204, 690, 691, 904
See application file for complete search history.

(56) References Cited

U.S. PATENT DOCUMENTS

| | | | |
|---|---|---|---|
| 7,088,354 B2 | 8/2006 | Matsumoto | |
| 7,173,454 B2 | 2/2007 | Kobayashi et al. | |
| 7,417,603 B2 | 8/2008 | Kim et al. | |
| 7,425,934 B2 | 9/2008 | Masumura et al. | |
| 7,511,707 B2 | 3/2009 | Ito et al. | |
| 2004/0164929 A1 | 8/2004 | Ide et al. | |
| 2004/0201546 A1 | 10/2004 | Masumura et al. | |
| 2004/0207333 A1 | 10/2004 | Matsumoto | |
| 2005/0195179 A1 | 9/2005 | Kobayashi et al. | |
| 2005/0219153 A1 | 10/2005 | Kim et al. | |

(Continued)

FOREIGN PATENT DOCUMENTS

JP    5-265393    10/1993

(Continued)

OTHER PUBLICATIONS

Japan Office Action, mailed Mar. 27, 2012, for corresponding Japanese Patent Application.

*Primary Examiner* — Ricardo L Osorio
(74) *Attorney, Agent, or Firm* — Greenblum & Bernstein, P.L.C.

(57) ABSTRACT

A scan IC includes a switch circuit and a logic circuit. The switch circuit includes first and second transistors and a level shift circuit. First and second control signals that change between a logical "1" and a logical "0" are applied to an input terminal of the logic circuit. The logic circuit applies a third control signal to the first transistor and applies a fourth control signal to the second transistor based on the applied first and second control signals. A detection circuit is connected to the input terminal of the logic circuit. An abnormality of the scan IC is detected by the detection circuit.

14 Claims, 26 Drawing Sheets

U.S. PATENT DOCUMENTS

| | | |
|---|---|---|
| 2006/0007063 A1 | 1/2006 | Ito et al. |
| 2007/0268216 A1 | 11/2007 | Arai et al. |
| 2009/0058310 A1 | 3/2009 | Arai et al. |
| 2009/0219272 A1 | 9/2009 | Nakata et al. |
| 2010/0060627 A1 | 3/2010 | Origuchi et al. |
| 2010/0066718 A1 | 3/2010 | Kuranuki et al. |

FOREIGN PATENT DOCUMENTS

| | | |
|---|---|---|
| JP | 2003-248456 | 9/2003 |
| JP | 2003-330409 | 11/2003 |
| JP | 2004-163526 | 6/2004 |
| JP | 2004-287003 | 10/2004 |
| JP | 2004-317609 | 11/2004 |
| JP | 2004-317610 | 11/2004 |
| JP | 2005-266776 | 9/2005 |
| JP | 2005-284242 | 10/2005 |
| JP | 2005-338839 | 12/2005 |
| JP | 2007-133060 | 5/2007 |
| JP | 2007-133290 | 5/2007 |

F I G. 9
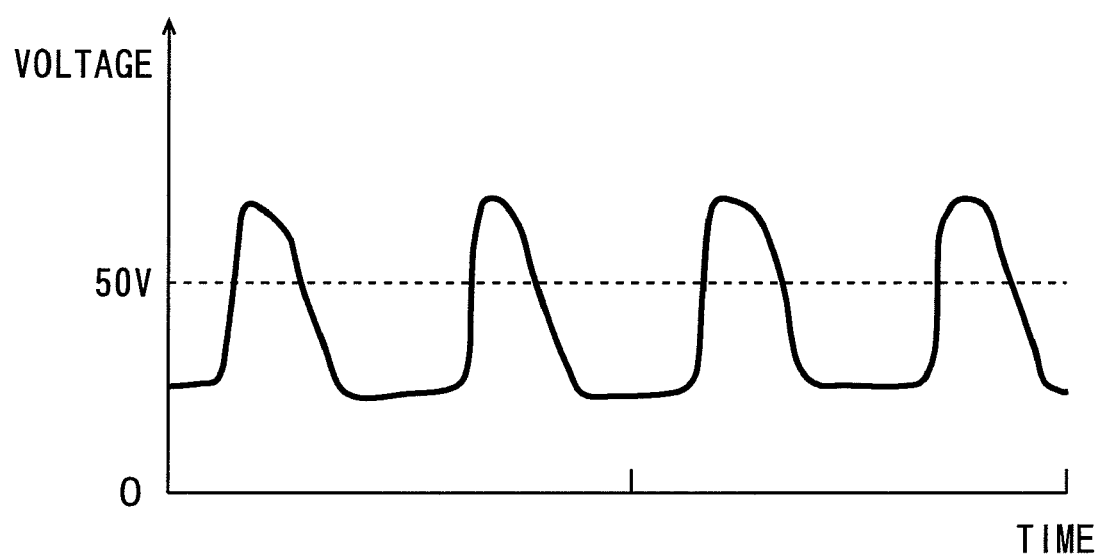

F I G. 1 2

| CONTROL SIGNAL | CONTROL STATE | | | | |
|---|---|---|---|---|---|
| | | HIGH IMPEDANCE | DATA | ALL-L | ALL-H |
| OC1 | | 0 | 0 | 1 | 1 |
| OC2 | | 0 | 1 | 0 | 1 |

F I G. 1 3
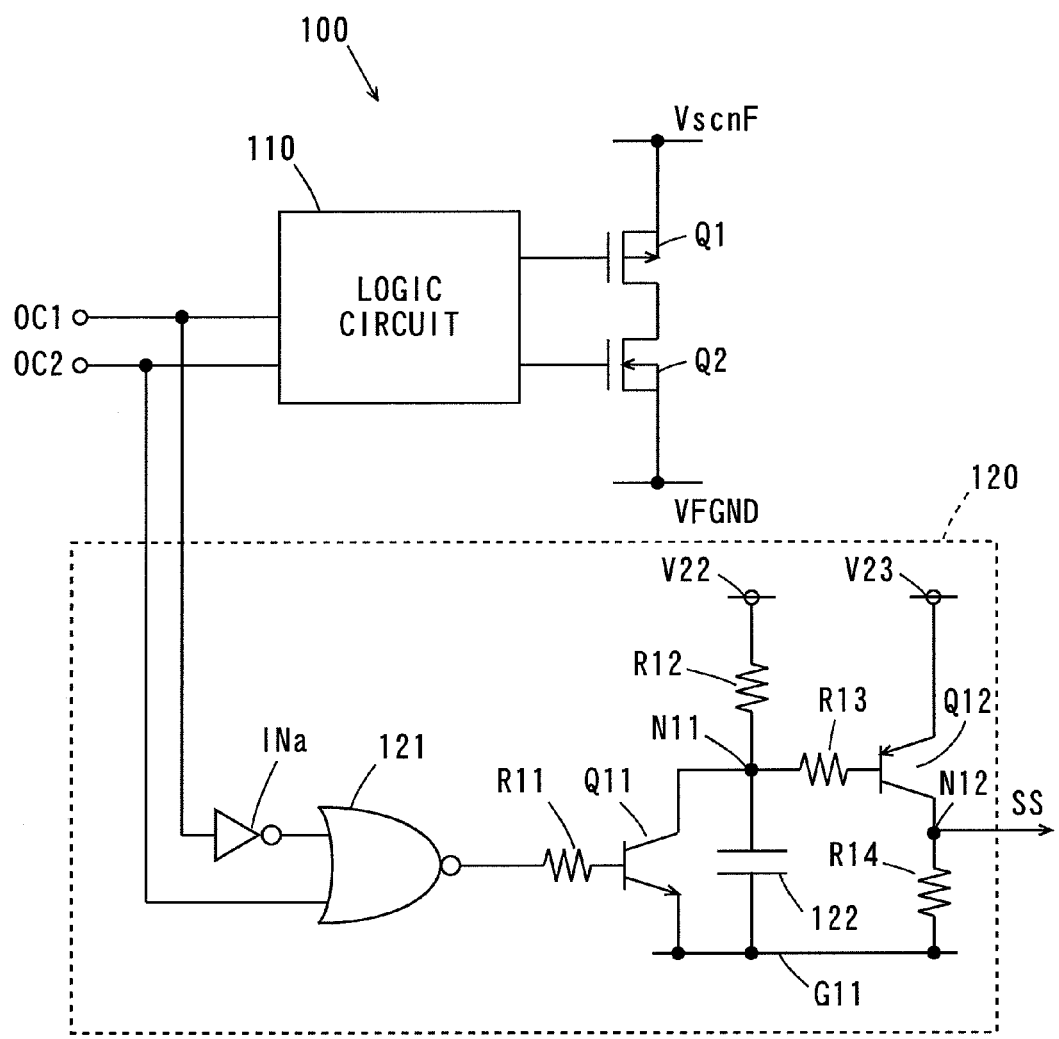

F I G. 1 5
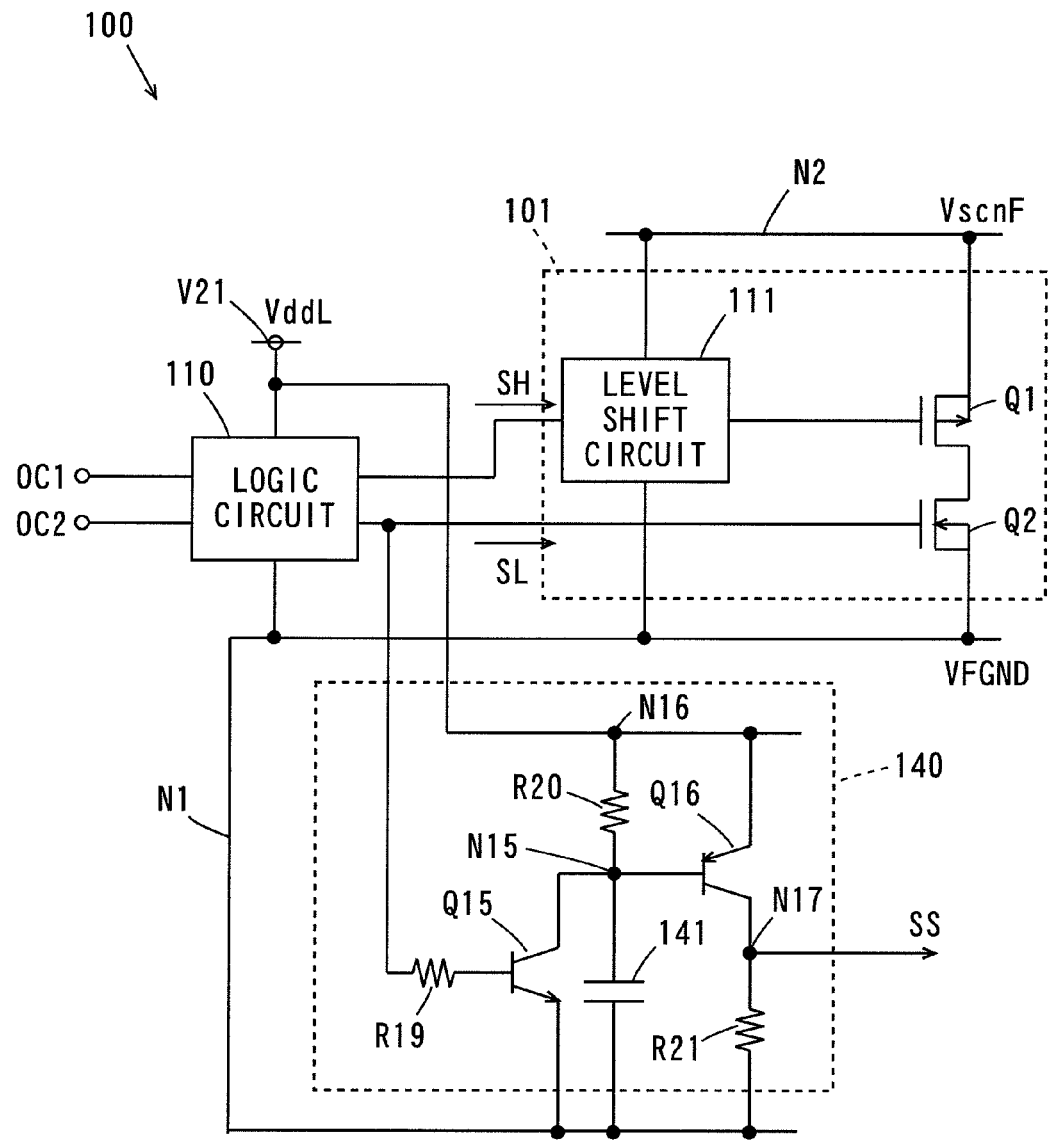

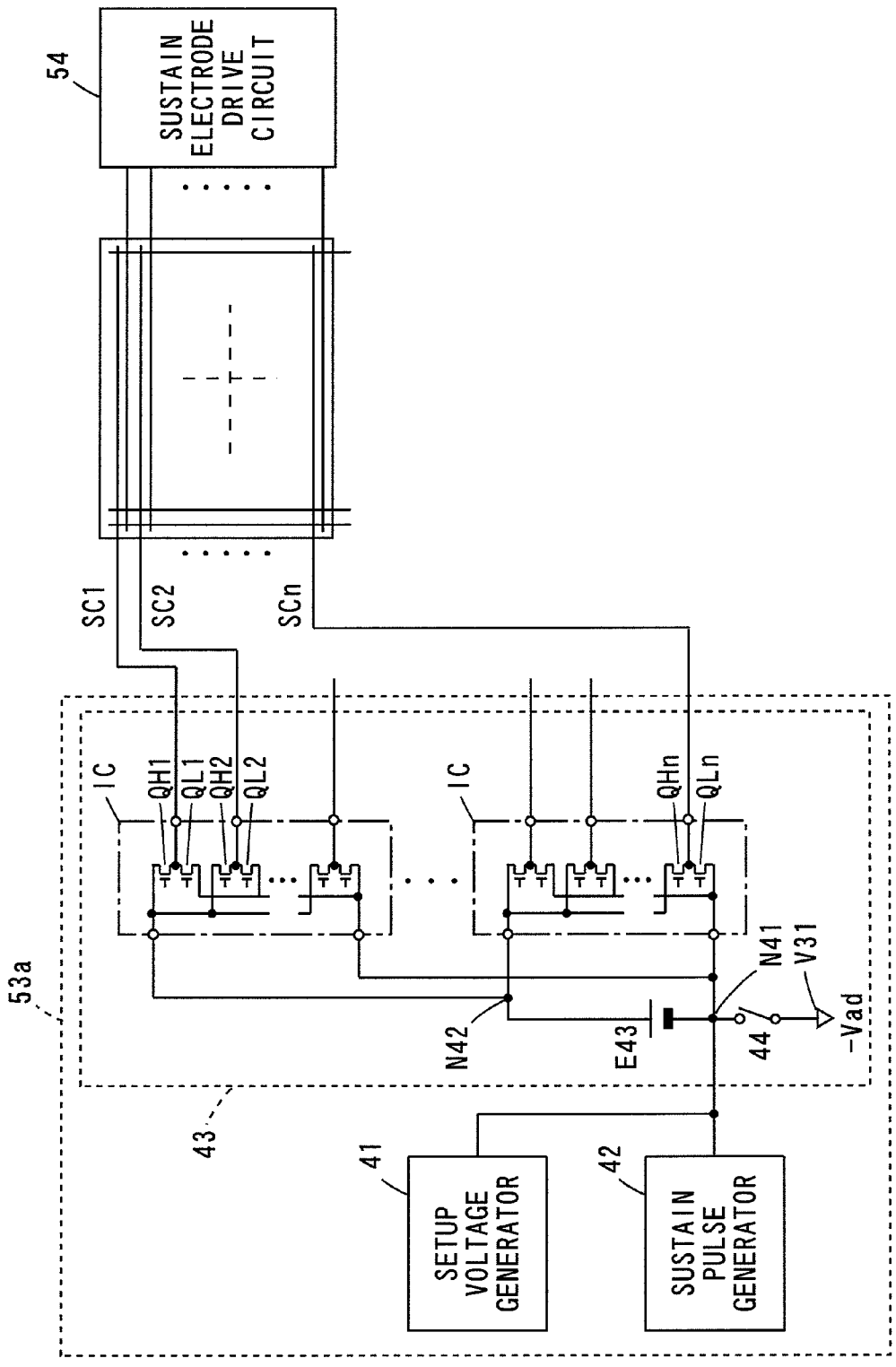
F I G. 1 9

FIG. 21

| C1 | C2 | STATES OF SWITCHING ELEMENTS | USED PERIOD |
|---|---|---|---|
| L | L | QH1~QHn; OFF   QL1~QLn; OFF | |
| L | H | Oj → ⌈H⌋  QHj; ON   QLj; OFF<br>Oj → ⌈L⌋  QHj; OFF  QLj; ON | WRITE PERIOD |
| H | L | QH1~QHn; OFF   QL1~QLn; ON | SUSTAIN PERIOD, SETUP PERIOD |
| H | H | QH1~QHn; ON    QL1~QLn; OFF | SETUP PERIOD |

DRIVING DEVICE AND DRIVING METHOD OF PLASMA DISPLAY PANEL, AND PLASMA DISPLAY DEVICE

TECHNICAL FIELD

The present invention relates to a driving device and a driving method of a plasma display panel, and a plasma display device employing the same.

BACKGROUND ART

An AC surface discharge type panel that is typical as a plasma display panel (hereinafter abbreviated as "a panel") includes a number of discharge cells between a front plate and a back plate arranged to be opposite to each other.

The front plate is constituted by a front glass substrate, a plurality of display electrodes, a dielectric layer and a protective layer. Each display electrode is composed of a pair of scan electrode and sustain electrode. The plurality of display electrodes are formed in parallel with one another on the front glass substrate, and the dielectric layer and the protective layer are formed so as to cover the display electrodes.

The back plate is constituted by a back glass substrate, a plurality of data electrodes, a dielectric layer, a plurality of barrier ribs and phosphor layers. The plurality of data electrodes are formed in parallel with one another on the back glass substrate, and the dielectric layer is formed so as to cover the data electrodes. The plurality of barrier ribs are formed in parallel with the data electrodes, respectively, on the dielectric layer, and the phosphor layers of R (red), G (green) and B (blue) are formed on a surface of the dielectric layer and side surfaces of the barrier ribs.

The front plate and the back plate are arranged to be opposite to each other such that the display electrodes intersect with the data electrodes in three dimensions, and then sealed. An inside discharge space is filled with a discharge gas. The discharge cells are formed at respective portions at which the display electrodes and the data electrodes are opposite to one another.

In the panel having such a configuration, a gas discharge generates ultraviolet rays, which cause phosphors of R, G and B to be excited and to emit light in each of the discharge cells. Accordingly, color display is performed.

A sub-field method is employed as a driving method of the panel. In the sub-field method, one field period is divided into a plurality of sub-fields, and the discharge cells are caused to emit light or not in the respective sub-fields, so that a gray scale display is performed. Each sub-field has a setup period, a write period and a sustain period.

In the setup period, a setup discharge is performed, and wall charges required for a subsequent write operation is formed in each discharge cell. In addition, the setup period has a function of generating priming for reducing a discharge time lag to stably generate a write discharge. Here, the priming means an excited particle that serves as an initiating agent for the discharge.

In the write period, progressive-scan pulses are applied to the scan electrodes while write pulses corresponding to image signals to be displayed are applied to the data electrodes. This selectively generates the write discharges between the scan electrodes and the data electrodes, causing the wall charges to be selectively formed.

In the subsequent sustain period, sustain pulses are applied between the scan electrodes and the sustain electrodes a predetermined number of times corresponding to luminances to be displayed. Accordingly, discharges are selectively induced in the discharge cells in which the wall charges have been formed by the write discharges, causing the discharge cells to emit light. Hereinafter, a ratio of a display luminance of each sub-field to a reference display luminance is referred to as "a luminance weight".

The plurality of scan electrodes are driven by a scan electrode drive circuit, the plurality of sustain electrodes are driven by a sustain electrode drive circuit, and the plurality of data electrodes are driven by a data electrode drive circuit.

The scan electrode drive circuit includes a plurality of scan ICs (Integrated Circuits) connected to the plurality of scan electrodes, respectively. Moreover, the scan electrode drive circuit has a first node to which a low potential is applied and a second node to which a high potential is applied. Each scan IC includes a first switch connected between the scan electrode and the first node and a second switch connected between the scan electrode and the second node. A capacitor that holds a constant voltage is connected between the first node and the second node. This causes a potential of the second node to be higher than a potential of the first node by the constant voltage.

The potential of the first node is controlled by a voltage application circuit, and either the first switch or the second switch of each scan IC is selectively turned on. Accordingly, driving voltages having predetermined waveforms are applied to the respective scan electrodes in the setup period, the write period and the sustain period (see Patent Documents 1 and 2, for example).

[Patent Document 1] JP 2004-287003 A
[Patent Document 2] JP 2005-266776 A
[Patent Document 3] JP 2004-317609 A

DISCLOSURE OF THE INVENTION

Problems to be Solved by the Invention

As described above, the potential of the second node is higher than the potential of the first node by the constant voltage in the scan electrode drive circuit. When the scan ICs with the first switches being turned on are switched to cause the second switches to be turned on, the potentials of the scan electrodes rapidly rise. In this case, a protective resistor is provided between the second node and the second switches of the scan ICs in order to restrict currents flowing from the second node to the scan ICs. This prevents large currents from flowing into the scan ICs.

However, temporary abnormal operations of the scan ICs may cause the second switches to be fixed in ON states when the second switches should be turned off. In this case, unexpected high voltages are applied to the scan electrodes.

For example, the first switches of the plurality of scan ICs are fixed in ON states and the second switches thereof are fixed in OFF states in the sustain period in normal operation. In this state, a pulse voltage is repeatedly applied to the first node. This causes sustain pulses to be applied to the scan electrodes.

When the first switches are fixed in the OFF state and the second switches are fixed in the ON state because of the temporary abnormal operations of the scan ICs in the sustain period, the unexpected high voltages are repeatedly applied to the scan electrodes. As a result, the large currents repeatedly flow to the protective resistors, and the protective resistors may be heated or solder may be molten.

In addition, the scan electrode drive circuit is divided to be mounted on a plurality of circuit boards, and the circuit boards are connected to one another through connectors in some cases (see Patent Document 3, for example). In this case, a control signal for controlling the scan ICs is transmitted among the plurality of circuit boards through the connectors.

In such a plasma display device, mistakes that have been made during working in the manufacture or maintenance or other causes may lead to poor connection of the connectors. In this case, the control signal is not appropriately transmitted to the scan ICs, resulting in the abnormal operations of the scan ICs. The flow of currents in this state may cause the scan electrode drive circuit to be damaged.

Moreover, the control signal is not appropriately transmitted to the scan ICs in some cases because of short circuits between terminals caused by dust, disconnections or other causes. Also in this case, the scan electrode drive circuit may be damaged.

An object of the present invention is to provide a driving device and a driving method of a plasma display panel capable of preventing the scan electrode drive circuit from being damaged because of the abnormal operations of switch circuits, and a plasma display device employing the same.

Means for Solving the Problems (1) According to an aspect of the present invention, a driving device that drives a plasma display panel including a plurality of discharge cells at intersections of a plurality of scan electrodes and a plurality of sustain electrodes with a plurality of data electrodes includes a plurality of switch circuits provided corresponding to the plurality of scan electrodes and controlled between a first state in which the plurality of scan electrodes are connected to a first node and a second state in which the plurality of scan electrodes are connected to a second node, a control circuit that controls the plurality of switch circuits, a voltage application circuit that changes a potential of the first node, a voltage hold circuit that holds a voltage between the first node and the second node to a first voltage, and a detection circuit that detects an abnormal operation in which at least part of the plurality of switch circuits is fixed in either the first or second state by the control circuit for a predetermined time period or longer.

In the driving device, the voltage between the first node and the second node is held at the first voltage by the voltage hold circuit. Thus, the potential of the second node is higher than the potential of the first node by the first voltage. In this state, the potential of the first node is changed by the voltage application circuit. In addition, the plurality of switch circuits are controlled to be in the first state and the second state by the control circuit, and the plurality of scan electrodes are selectively connected to the first node and the second node. This causes various driving waveforms to be applied to the plurality of scan electrodes.

In normal operation, the plurality of switch circuits are controlled to be in both the first state and the second state at least once in the predetermined time period. On the other hand, at least part of the plurality of switch circuits is fixed in either the first or second state for the predetermined time period or longer in abnormal operation.

The abnormal operation is detected by the detection circuit. Thus, the driving device can be quickly stopped in the case of an occurrence of the abnormal operation. This prevents the continuous flow of currents in the state of the occurrence of the abnormal operation to prevent components from being damaged.

(2) The plasma display panel may be driven by a sub-field method in which one field includes a plurality of sub-fields, a sustain pulse generator that generates a sustain pulse to be applied to the plurality of scan electrodes in a sustain period of each sub-field may be further included, and an operation of the sustain pulse generator may be stopped when the abnormal operation is detected by the detection circuit.

In this case, the operation of the sustain pulse generator is stopped in the case of the abnormal operation. Therefore, even though a large sustain discharge current is generated by the sustain pulse generator in the sustain period, the large sustain discharge current is prevented from continuously flowing in the case of the abnormal operation. This reliably prevents the components from being damaged.

(3) The plurality of switch circuits may be divided to be mounted on a plurality of circuit boards, and the detection circuit may include a plurality of abnormality detectors that are provided in the plurality of circuit boards, respectively, and detect abnormal operations of the respective switch circuits mounted on the circuit boards.

In this case, the abnormality detector is provided in each of the plurality of circuit boards. Therefore, even though the abnormal operation of the switch circuit occurs in any of the plurality of circuit boards, the abnormal operation can be reliably detected.

(4) The driving device may further include a protective resistor provided between the voltage hold circuit and the second node, wherein the detection circuit may detect at least part of the plurality of switch circuits being held in the second state for the predetermined time period or longer as the abnormal operation based on a state of a signal in the control circuit.

In this case, the abnormal operation in which at least part of the plurality of switch circuits is held in the second state for the predetermined time period or longer is detected based on the state of the signal in the control circuit. This reliably prevents the currents from flowing into the protective resistor provided between the voltage hold circuit and the second node over a long time period.

(5) The predetermined time period may be one field period. In the normal operation, the plurality of switch circuits are controlled to be in the first state at least once in the one field period. Thus, the abnormal operation can be detected by detecting that at least part of the plurality of switch circuits are held in the second state for the one field period or longer.

(6) The driving device may further include a signal generation circuit that generates a first control signal, wherein the control circuit may control the plurality of switch circuits in response to the first control signal generated by the signal generation circuit, and the detection circuit may detect the abnormal operation based on a state of the first control signal as a state of the signal.

When at least part of the plurality of switch circuits is in the abnormal operation, an abnormality occurs in the first control signal generated by the signal generation circuit. Therefore, the abnormal operation of the switch circuit can be detected based on the state of the first control signal.

(7) The control circuit may control the plurality of switch circuits to be in the first state when the first control signal is a first logic, and control the plurality of switch circuits to be in the second state when the first control signal is a second logic, and the detection, circuit may output an abnormality detection signal indicating an occurrence of the abnormal operation when the first control signal continues to be the second logic for the predetermined time period or longer.

In this case, when the first control signal continues to be the second logic for the predetermined time period or longer, the plurality of switch circuits are held in the second state for the predetermined time period or longer. In this case, the abnormality detection signal indicating the occurrence of the abnormal operation can be output. A power supply circuit of the driving device can be temporarily stopped using the detection signal. Thus, even though the abnormal operation occurs, power is again applied to recover the driving device.

(8) The detection circuit may include a first capacitive element, a first charge circuit that causes the first capacitive element to be charged at a constant time constant when the first control signal is the second logic, a first discharge circuit that causes the first capacitive element to be discharged when the first control signal is not the second logic, and a first signal output circuit that outputs the abnormality detection signal when a charging voltage of the first capacitive element is larger than a predetermined value.

In this case, when the first control signal is maintained to be the second logic, the first capacitive element is charged at the constant time constant by the first charge circuit to gradually increase the charging voltage of the first capacitive element. Therefore, the time constant is set such that the charging voltage of the first capacitive element exceeds the predetermined value when the first control signal is maintained to be the second logic for the predetermined time period or longer. Accordingly, the abnormality detection signal indicating the occurrence of the abnormal operation can be output when at least part of the plurality of switch circuits is held in the second state for the predetermined time period or longer.

(9) The control circuit may generate a second control signal for controlling the plurality of switch circuits, and the detection circuit may detect the abnormal operation based on a state of the second control signal as a state of the signal.

When at least part of the plurality of switch circuits is in the abnormal operation, the abnormality occurs in the second control signal generated by the control circuit. Therefore, the abnormal operation of the switch circuit can be detected based on the state of the second control signal.

(10) The plurality of switch circuits may include first switching elements connected between the scan electrodes corresponding to the plurality of switch circuits, respectively, and the first node, and second switching elements connected between the scan electrodes corresponding to the plurality of switch circuits, respectively, and the second node, the control circuit may generate a first switching signal for controlling ON/OFF of the plurality of first switching elements and a second switching signal for controlling ON/OFF of the plurality of second switching elements as second control signals, and the detection circuit may output an abnormality detection signal indicating an occurrence of the abnormal operation of the switch circuits based on the first switching signal when the first switching element is not turned on within the predetermined time period.

In this case, when the first switching element is fixed to OFF and the second switching element is fixed to ON for the predetermined time period or longer, the switch circuit is held in the second state for the predetermined time period or longer. In the case, the abnormality detection signal indicating the occurrence of the abnormal operation can be output. The power supply circuit of the driving device can be temporarily stopped using the detection signal. Thus, even though the abnormal operation occurs, the power is again applied to recover the driving device.

(11) The detection circuit may include a second capacitive element, a second charge circuit that causes the second capacitive element to be charged at a constant time constant when the first switching element is turned off, a second discharge circuit that causes the second capacitive element to be discharged when the first switching element is turned on, and a second signal output circuit that outputs the abnormality detection signal when a charging voltage of the second capacitive element is larger than a predetermined value.

In this case, when the first switching element is maintained in OFF by the first switching signal, the second capacitive element is charged at the constant time constant by the second charge circuit to cause the charging voltage of the second capacitive element to gradually increase. Therefore, the time constant is set such that the charging voltage of the second capacitive element exceeds the predetermined value when the first switching element is maintained in OFF for the predetermined time period or longer. Thus, when at least part of the plurality of switch circuits is held in the first state for the predetermined time period or longer, the abnormality detection signal indicating the occurrence of the abnormal operation can be output.

(12) The driving circuit may further include a voltage detection circuit that detects that the voltage held by the voltage hold circuit exceeds an allowable value, wherein the voltage detection circuit may output a common detection signal when the voltage held by the voltage hold circuit exceeds the allowable value or when an occurrence of the abnormal operation of at least part of the plurality of switch circuits is detected by the detection circuit.

In this case, the common detection signal is output from the voltage detection circuit when the voltage held by the voltage hold circuit exceeds the allowable value or the occurrence of the abnormal operation is detected in at least part of the plurality of switch circuits by the detection circuit. The components and the detection signal of the detection circuit and the voltage hold circuit are used in common, thus reducing the number of the components and the number of assembling steps. As a result, the driving device can be reduced in cost.

(13) According to another aspect of the present invention, a driving method of a plasma display panel including a plurality of discharge cells at intersections of a plurality of scan electrodes and a plurality of sustain electrodes with a plurality of data electrodes includes the steps of holding a voltage between a first node and a second node to a first voltage by a voltage hold circuit, changing a potential of the first node by a voltage application circuit, controlling a plurality of switch circuits provided corresponding to the plurality of scan electrodes between a first state in which the plurality of scan electrodes are connected to a first node and a second state in which the plurality of scan electrodes are connected to a second node by a control circuit, and detecting an abnormal operation in which at least part of the plurality of switch circuits is fixed in either the first or second state by the control circuit for a predetermined time period or longer.

In the driving method, the voltage between the first node and the second node is held at the first voltage by the voltage hold circuit. Thus, the potential of the second node is higher than the potential of the first node by the first voltage. In this state, the potential of the first node is changed by the voltage application circuit. In addition, the plurality of switch circuits are controlled to be in the first state and the second state by the control circuit, and the plurality of scan electrodes are selectively connected to the first node and the second node. This causes various driving waveforms to be applied to the plurality of scan electrodes.

In normal operation, the plurality of switch circuits are controlled to be in both the first state and the second state at least once in the predetermined time period. On the other hand, at least part of the plurality of switch circuits is fixed in either the first or second state for the predetermined time period or longer in abnormal operation.

The abnormal operation is detected by the detection circuit. Thus, the driving device can be quickly stopped in the case of the occurrence of the abnormal operation. This prevents the continuous flow of currents in the state of the occurrence of the abnormal operation to prevent components from being damaged.

(14) According to still another aspect of the present invention, a plasma display device includes a plasma display panel including a plurality of discharge cells at intersections of a plurality of scan electrodes and a plurality of sustain electrodes with a plurality of data electrodes, and a driving device that drives the plurality of scan electrodes of the plasma display panel, wherein the driving device includes a plurality of switch circuits provided corresponding to the plurality of scan electrodes and controlled between a first state in which the plurality of scan electrodes are connected to a first node and a second state in which the plurality of scan electrodes are connected to a second node, a control circuit that controls the plurality of switch circuits, a voltage application circuit that changes a potential of the first node, a voltage hold circuit that holds a voltage between the first node and the second node to a first voltage, and a detection circuit that detects an abnormal operation in which at least part of the plurality of switch circuits is fixed in either the first or second state by the control circuit for a predetermined time period or longer.

In the plasma display device, the plurality of scan electrodes of the plasma display panel are driven by the driving device.

In the driving device, the voltage between the first node and the second node is held at the first voltage by the voltage hold circuit. Thus, the potential of the second node is higher than the potential of the first node by the first voltage. In this state, the potential of the first node is changed by the voltage application circuit. In addition, the plurality of switch circuits are controlled to be in the first state and the second state by the control circuit, and the plurality of scan electrodes are selectively connected to the first node and the second node. This causes various driving waveforms to be applied to the plurality of scan electrodes.

In normal operation, the plurality of switch circuits are controlled to be in both the first state and the second state at least once in a predetermined time period. On the other hand, at least part of the plurality of switch circuits is fixed in either the first or second state for the predetermined time period or longer in abnormal operation.

The abnormal operation is detected by the detection circuit. Thus, the driving device can be quickly stopped in the case of the occurrence of the abnormal operation. This prevents the continuous flow of currents in the state of the occurrence of the abnormal operation to prevent components from being damaged.

Effects of the Invention

According to the present invention, the driving device can be quickly stopped in the case of the occurrence of the abnormal operation. This prevents the continuous flow of the currents in the state of the occurrence of the abnormal operation to prevent components from being damaged.

BRIEF DESCRIPTION OF THE DRAWINGS

FIG. 9 is a waveform diagram showing one example of the abnormal pulse.

FIG. 12 is a diagram showing correspondences between logic of control signals and control states of transistors.

FIG. 13 is a circuit diagram showing the configuration of a detection circuit.

FIG. 15 is a circuit diagram showing still another configuration of the detection circuit.

FIG. 19 is a circuit diagram showing the configuration of the scan electrode drive circuit of the plasma display device according to the embodiment of the present invention.

FIG. 21 is a diagram showing a relationship between the control signals and control states of switching elements.

BEST MODE FOR CARRYING OUT THE INVENTION

Figure 1:
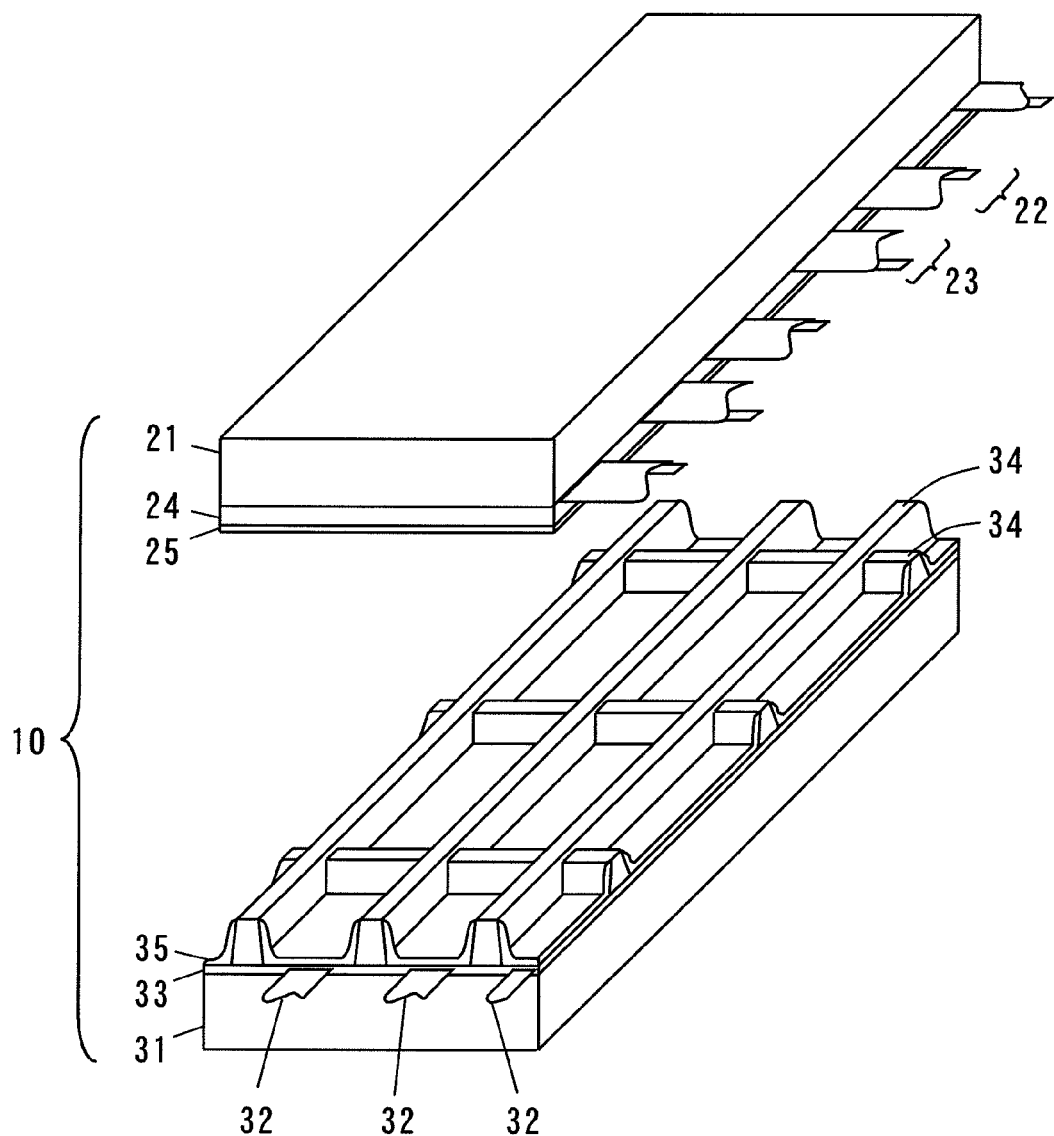
FIG. 1 is an exploded perspective view showing part of a plasma display panel in a plasma display device according to an embodiment of the present invention.

The embodiments of the present invention will be described in detail referring to the drawings. The embodiments below describe a plasma display device.

(1) First Embodiment (1-1) Configuration of Panel

FIG. 1 is an exploded perspective view showing part of a plasma display panel in a plasma display device according to an embodiment of the present invention.

The plasma display panel (hereinafter abbreviated as the panel) 10 includes a front substrate 21 and a back substrate 31 that are made of glasses and arranged to be opposite to each other. A discharge space is formed between the front substrate 21 and the back substrate 31. A plurality of pairs of scan electrodes 22 and sustain electrodes 23 are formed in parallel with one another on the front substrate 21. Each pair of scan electrode 22 and sustain electrode 23 constitutes a display electrode. A dielectric layer 24 is formed so as to cover the scan electrodes 22 and the sustain electrodes 23, and a protective layer 25 is formed on the dielectric layer 24.

A plurality of data electrodes 32 covered with an insulator layer 33 are provided on the back substrate 31, and barrier ribs 34 are provided in a shape of a number sign on the insulator layer 33. Phosphor layers 35 are provided on a surface of the insulator layer 33 and side surfaces of the barrier ribs 34. Then, the front substrate 21 and the back substrate 31 are arranged to be opposite to each other such that the plurality of pairs of scan electrodes 22 and sustain electrodes 23 vertically intersect with the plurality of data electrodes 32, and the discharge space is formed between the front substrate 21 and the back substrate 31. The discharge space is filled with a mixed gas of neon and xenon, for example, as a discharge gas. Note that the configuration of the panel is not limited to the configuration described above. A configuration including the barrier ribs in a striped shape may be employed, for example.

Figure 2:
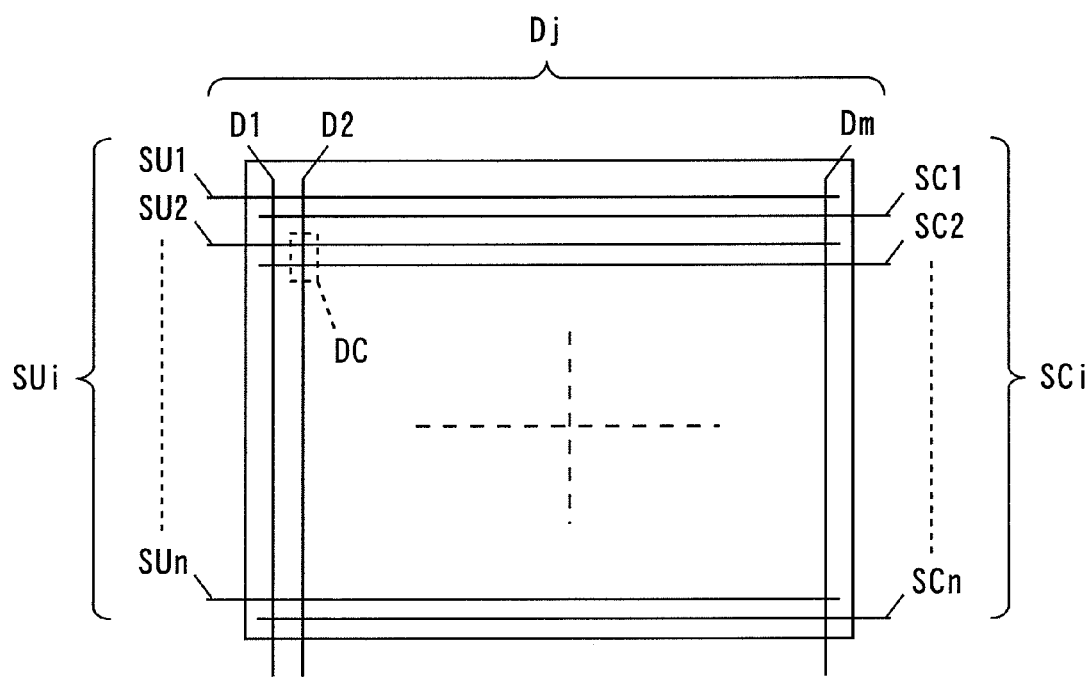
FIG. 2 is a diagram showing an arrangement of electrodes of the panel in the embodiment of the present invention.

FIG. 2 is a diagram showing an arrangement of the electrodes of the panel in the embodiment of the present invention. N scan electrodes SC1 to SCn (the scan electrodes 22 of FIG. 1) and n sustain electrodes SU1 to SUn (the sustain electrodes 23 of FIG. 1) are arranged along a row direction, and m data electrodes D1 to Dm (the data electrodes 32 of FIG. 1) are arranged along a column direction. Each of N and m is a natural number of not less than two. A discharge cell DC is formed at an intersection of a pair of scan electrode SCi (i=1 to n) and sustain electrode SUi (i=1 to n) with one data electrode Dj (j=1 to m). Accordingly, m×n discharge cells are formed in the discharge space.

(1-2) Configuration of the Plasma Display Device

Figure 3:
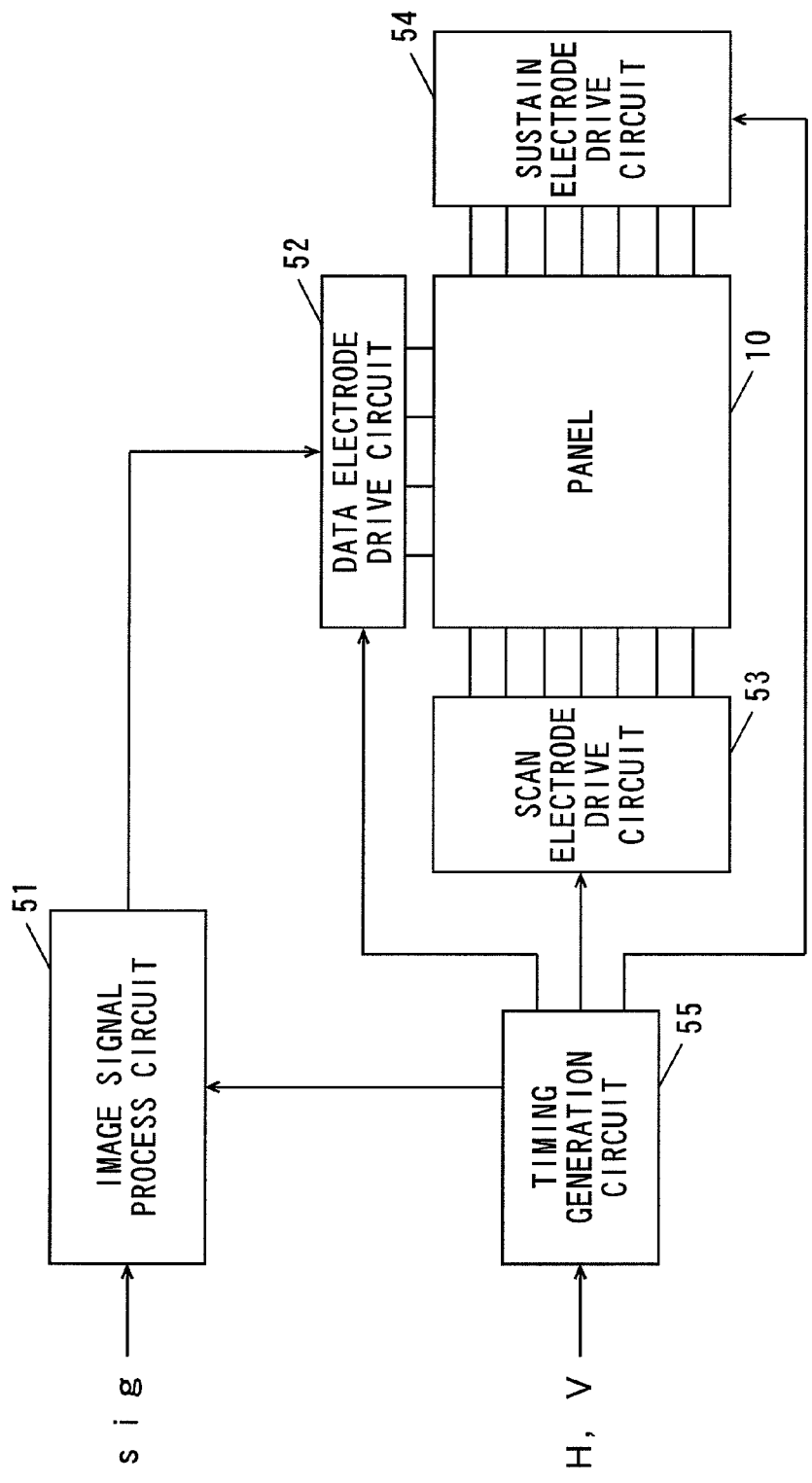
FIG. 3 is a block diagram of circuits of the plasma display device according to the embodiment of the present invention.

FIG. 3 is a circuit block diagram of the plasma display device according to the embodiment of the present invention.

This plasma display device includes the panel 10, an image signal process circuit 51, a data electrode drive circuit 52, a scan electrode drive circuit 53, a sustain electrode drive circuit 54, a timing generation circuit 55 and a power supply circuit (not shown).

The image signal processing circuit 51 converts an image signal sig into image data corresponding to the number of pixels of the panel 10, divides the image data on each pixel into a plurality of bits corresponding to a plurality of sub-fields, and outputs them to the data electrode drive circuit 52.

The data electrode drive circuit 52 converts the image data for each sub-field into signals corresponding to the data electrodes D1 to Dm, respectively, and drives the data electrodes D1 to Dm based on the respective signals.

The timing generation circuit 55 generates timing signals based on a horizontal synchronization signal H and a vertical synchronization signal V, and supplies the timing signals to each of the drive circuit blocks (the image signal processing circuit 51, the data electrode drive circuit 52, the scan electrode drive circuit 53 and the sustain electrode drive circuit 54).

The scan electrode drive circuit 53 supplies driving waveforms to the scan electrodes SC1 to SCn based on the timing signals, and the sustain electrode drive circuit 54 supplies driving waveforms to the sustain electrodes SU1 to SUn based on the timing signals.

(1-3) Sub-Field Configuration

Next, a sub-field configuration is explained. In a sub-field method, one field is divided into a plurality of sub-fields on a time base, and respective luminance weights are set for the plurality of sub-fields.

For example, one field is divided into ten sub-fields (hereinafter referred to as a first SF, a second SF, . . . and a tenth SF) on the time base, and the sub-fields have the luminance weights of 0.5, 1, 2, 3, 6, 9, 15, 22, 30 and 40, respectively.

Figure 4:
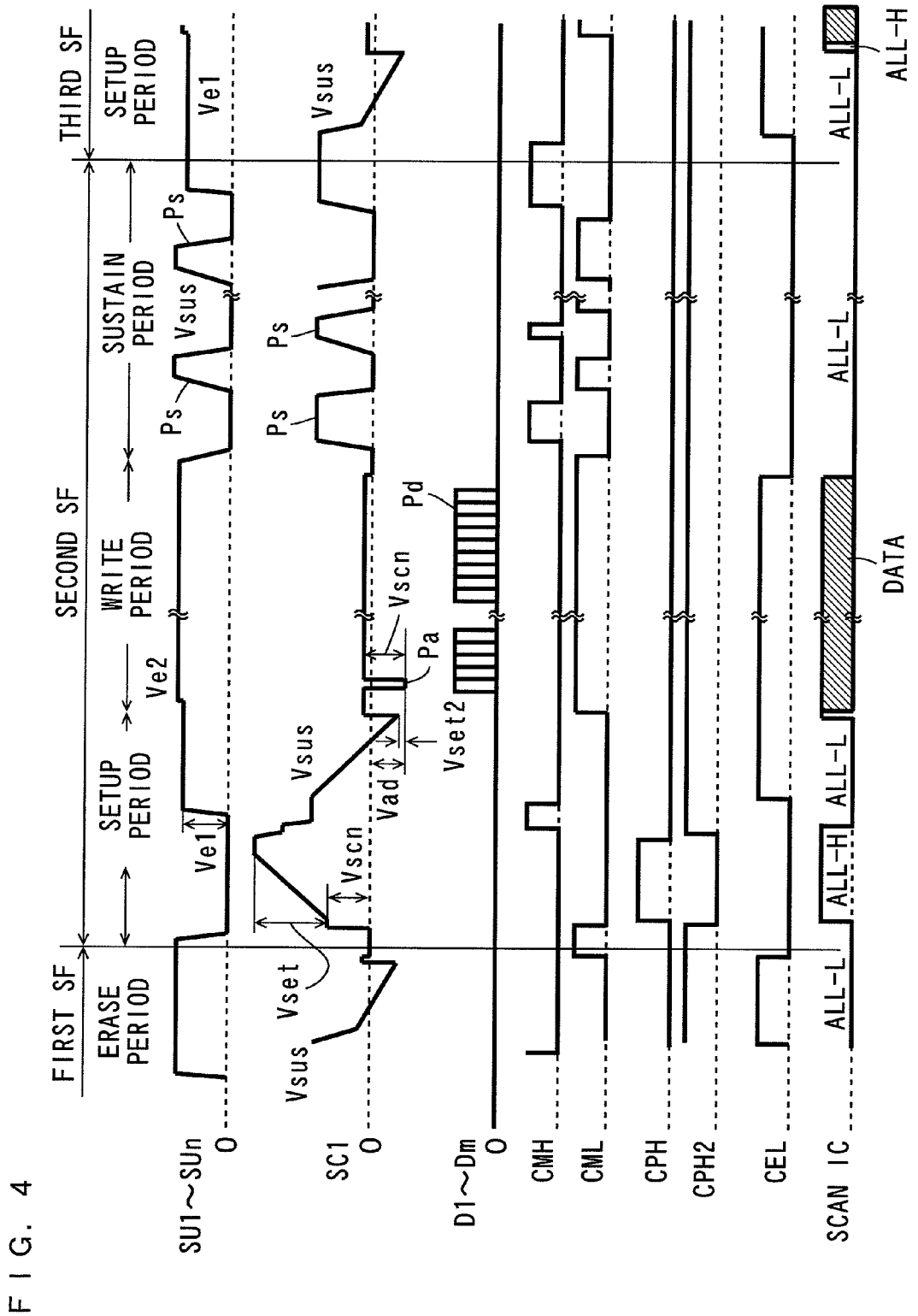
FIG. 4 is a waveform diagram of driving voltages in a sub-field configuration of the plasma display device of FIG. 3.

FIG. 4 is a driving voltage waveform diagram in the sub-field configuration of the plasma display device of FIG. 3.

The driving waveforms of the sustain electrodes SU1 to SUn, one scan electrode SC1 and the data electrodes D1 to Dm are shown in upper stages of FIG. 4. A period from an erase period of the first SF to a setup period of the third SF in one field is shown. Here, description is mainly made of the second SF.

In the first half of a setup period of the second SF, the data electrodes D1 to Dm and the sustain electrodes SU1 to SUn are held at 0 V (a ground potential), and a ramp voltage is applied to the scan electrodes SC1 to SCn. This ramp voltage gradually rises from a positive potential Vscn that is not more than a discharge start voltage toward a positive potential (Vscn+Vset) that exceeds the discharge start voltage. Then, first weak setup discharges are induced in all the discharge cells, so that negative wall charges are stored on the scan electrodes SC1 to SCn while positive wall charges are stored on the sustain electrodes SU1 to SUn and the data electrodes D1 to Dm, respectively. Here, a voltage caused by wall charges stored on the dielectric layer, the phosphor layer and so on covering the electrode is referred to as a wall voltage on the electrode.

In the subsequent second half of the setup period, the sustain electrodes SU1 to SUn are kept at a positive potential Ve1, and the ramp voltage that gradually drops from the positive potential (Vscn+Vset) toward a negative potential (−Vad) is applied to the scan electrodes SC1 to SCn. Then, second weak setup discharges are induced in all the discharge cells, so that the wall voltage on the scan electrodes SC1 to SCn and the wall voltage on the sustain electrodes SU1 to SUn are weakened, and the wall voltage on the data electrodes D1 to Dm are adjusted to a value suitable for a write operation.

In this manner, a setup operation for all the cells, in which the setup discharges are generated in all the discharge cells, is performed in the setup period of the second SF.

In a write period of the second SF, a potential Ve2 is applied to the sustain electrodes SU1 to SUn, and the scan electrodes SC1 to SCn are temporarily held at a potential (Vscn−Vad). Next, a positive write pulse Pd is applied to a data electrode Dk (k is any of 1 to m), among the data electrodes D1 to Dm, of the discharge cell that should emit light on a first row while a negative scan pulse voltage Pa (=−Vad) is applied to the scan electrode SC1 on the first row. Then, a voltage at an intersection of the data electrode Dk and the scan electrode SC1 attains a value obtained by adding the wall voltage on the data electrode Dk and the wall voltage on the scan electrode SC1 to an externally applied voltage (Pd−Pa), exceeding the discharge start voltage. This generates a write discharge between the data electrode Dk and the scan electrode SC1 and between the sustain electrode SU1 and the scan electrode SC1. As a result, in the discharge cell, the positive wall charges are stored on the scan electrode SC1, the negative wall charges are stored on the sustain electrode SU1 and the negative wall charges are stored on the data electrode Dk.

In this manner, the write operation for generating the write discharge in the discharge cell that should emit light on the first row to cause the wall charges to be stored on each of the electrodes is performed. On the other hand, since a voltage at an intersection of a data electrode Dh (h≠k) to which the write pulse Pd has not been applied and the scan electrode SC1 does not exceed the discharge start voltage, the write discharge is not generated. The above-described write operation is sequentially performed in the discharge cells on the first row to the n-th row, and the write period is then finished.

In a subsequent sustain period, the sustain electrodes SU1 to SUn are returned to 0 V, and a sustain pulse Ps (=Vsus) is applied to the scan electrodes SC1 to SCn for the first time in the sustain period. At this time, in the discharge cell in which the write discharge has been generated in the write period, a voltage between the scan electrode SCi and the sustain electrode SUi attains a value obtained by adding the wall voltage on the scan electrode SCi and the wall voltage on the sustain electrode SUi to the sustain pulse Ps (=Vsus), exceeding the discharge start voltage. This induces a sustain discharge between the scan electrode SCi and the sustain electrode SUi, causing the discharge cell to emit light. As a result, the negative wall charges are stored on the scan electrode SCi, the positive wall charges are stored on the sustain electrode SUi, and the positive wall charges are stored on the data electrode Dk.

In the discharge cell in which the write discharge has not been generated in the write period, the sustain discharge is not induced and the wall charges are held in a state at the end of the setup period. Next, the scan electrodes SC1 to SCn are returned to 0 V, and the sustain pulse Ps is applied to the sustain electrodes SU1 to SUn. Then, since the voltage between the sustain electrode SUi and the scan electrode SCi exceeds the discharge start voltage in the discharge cell in which the sustain discharge has been induced, the sustain discharge is again induced between the sustain electrode SUi and the scan electrode SCi, the negative wall charges are stored on the sustain electrode SUi, and the positive wall charges are stored on the scan electrode SCi.

Similarly to the foregoing, a predetermined number of sustain pulses Ps are alternately applied to the respective scan electrodes SC1 to SCn and sustain electrodes SU1 to SUn, so that the sustain discharges are continuously performed in the discharge cells in which the write discharges have been generated in the write period. In this manner, a sustain operation is finished in the sustain period.

In the setup period of the third SF, the sustain electrodes SU1 to SUn are held at the potential Ve1, the data electrodes D1 to Dm are held at 0 V, and the ramp voltage that gradually drops from the positive potential Vsus toward the negative potential (−Vad) is applied to the scan electrodes SC1 to SCn. Then, weak setup discharges are generated in the discharge cells in which the sustain discharges have been induced in the sustain period of the preceding sub-field. Accordingly, the wall voltage on the scan electrodes SCi and the wall voltage on the sustain electrodes SUi are weakened, and the wall voltage on the data electrode Dk is adjusted to the value suitable for the write operation.

Meanwhile, the discharges are not generated and the wall charges are kept constant in the state at the end of the setup period of the preceding sub-field in the discharge cells in which the write discharges and the sustain discharges have not been induced in the preceding sub-field.

As described above, a selective setup operation for selectively generating the setup discharges in the discharge cells in which the sustain discharges have been induced in the immediately preceding sub-field is performed in the setup period of the third SF.

(1-4) Configuration of the Scan Electrode Drive Circuit 53

Figure 5:
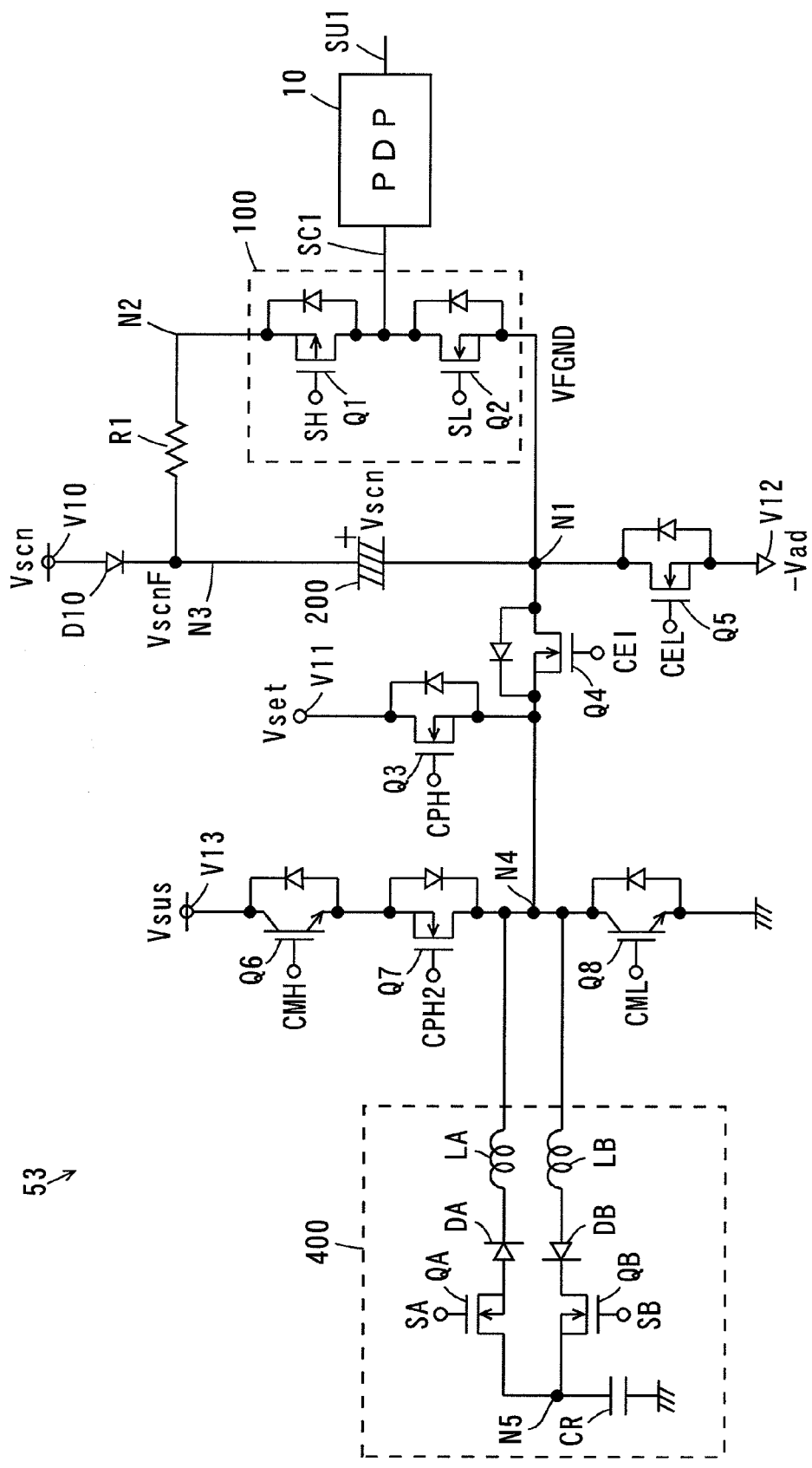
FIG. 5 is a circuit diagram showing the configuration of a scan electrode drive circuit.

FIG. 5 is a circuit diagram showing the configuration of the scan electrode drive circuit 53.

The scan electrode drive circuit 53 includes a scan IC (Integrated Circuit) 100, a DC power supply 200, a protective resistor R1, a recovery circuit 400, a diode D10, n-channel field effect transistors (hereinafter abbreviated as transistors) Q3 to Q5, Q7 and NPN bipolar transistors (hereinafter abbreviated as transistors) Q6, Q8. One scan IC 100 connected to the one scan electrode SC1 in the scan electrode drive circuit 53 is shown in FIG. 5. The same scan ICs 100 are connected to the other scan electrodes SC2 to SCn, respectively. The plurality of scan electrodes SC1 to SCn are connected between a common node N1 and a common node N2.

The scan IC 100 includes a p-channel field effect transistor (hereinafter abbreviated as a transistor) Q1 and an n-channel field effect transistor (hereinafter abbreviated as a transistor) Q2. The recovery circuit 400 includes n-channel field effect transistors (hereinafter abbreviated as transistors) QA, QB, recovery coils LA, LB, a recovery capacitor CR and diodes DA, DB.

The scan IC 100 is connected between the node N1 and the node N2. The transistor Q1 of the scan IC 100 is connected between the node N2 and the scan electrode SC1, and the transistor Q2 is connected between the scan electrode SC1 and the node N1. A control signal SH is applied to a gate of the transistor Q1, and a control signal SL is applied to a gate of the transistor Q2. Details of the scan ICs 100 will be described below.

The protective resistor R1 is connected between the node N2 and a node N3. A power supply terminal V10 that receives the voltage Vscn is connected to the node N3 through the diode D10. The DC power supply 200 is connected between the node N1 and the node N3. The DC power supply 200 is composed of an electrolytic capacitor, and functions as a floating power supply that holds the voltage Vscn. Hereinafter, a potential of the node N1 is referred to as VFGND, and a potential of the node N3 is referred to as VscnF. The potential VscnF of the node N3 has a value obtained by adding the potential Vscn to the potential VFGND of the node N1. That is, VscnF=VFGND+Vscn.

The transistor Q3 is connected between a power supply terminal V11 that receives the voltage Vset and a node N4, and a control signal CPH is applied to its gate. The transistor Q4 is connected between the node N1 and the node N4, and a control signal CEI is applied to its gate. The transistor Q5 is connected between the node N1 and a power supply terminal V12 that receives the negative voltage (−Vad), and a control signal CEL is applied to its gate. The control signal CEI is an inverted signal of the control signal CEL.

The transistors Q6, Q7 are connected between a power supply terminal V13 that receives the voltage Vsus and the node N4. A control signal CMH is applied to a base of the transistor Q6, and a control signal CPH2 is applied to a gate of the transistor Q7. The transistor Q8 is connected between the node N4 and a ground terminal, and a control signal CML is applied to its base.

Between the node N4 and a node N5, the recovery coil LA, the diode DA and the transistor QA are connected in series, and the recovery coil LB, the diode DB and the transistor QB are connected in series. The recovery capacitor CR is connected between the node N5 and the ground terminal.

(1-5) Operation of the Scan Electrode Drive Circuit 53

Figure 6:
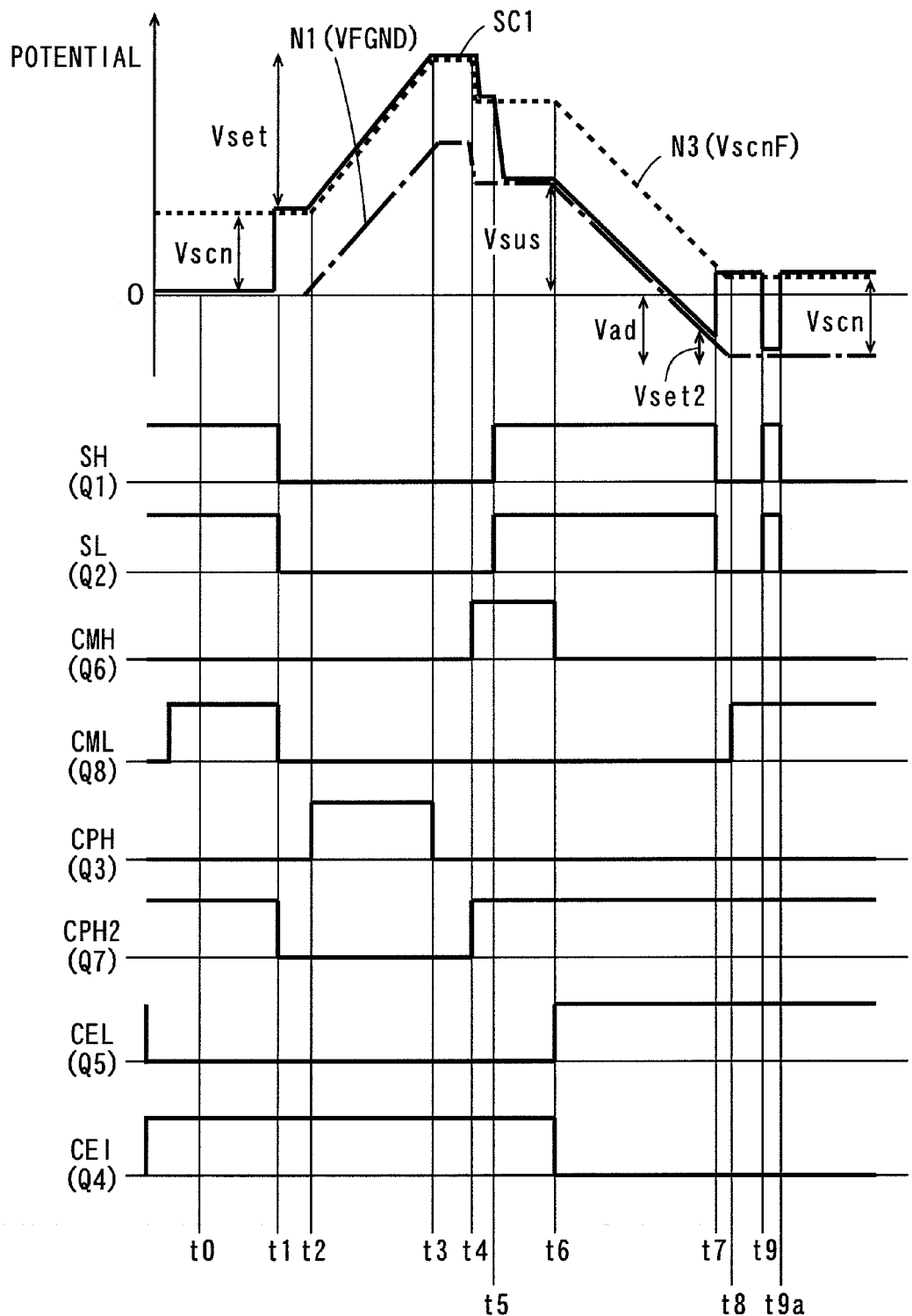
FIG. 6 is a detailed timing chart in a setup period and a write period of a second sub-field of FIG. 4.

FIG. 6 is a detailed timing chart in the setup period and the write period of the second sub-field of FIG. 4.

Change of the potential VFGND of the node N1 is indicated by the one-dot and dash line, change of the potential VscnF of the node N3 is indicated by the dotted line, and change of a potential of the scan electrode SC1 is indicated by the solid line in the top stage of FIG. 6. Note that control signals SA, SB applied to the recovery circuit 400 are not shown in FIG. 6.

At a starting time point t0 of the setup period, the control signals CMH, CPH, CEL are at a low level, and the control signals SH, SL, CML, CPH2, CEI are at a high level. This causes the transistors Q1, Q6, Q3, Q5 to be turned off and the transistors Q2, Q8, Q7, Q4 to be turned on. Thus, the node N1 attains the ground potential (0 V) and the potential VscnF of the node N3 attains Vscn. Since the transistor Q2 is turned on, the potential of the scan electrode SC1 attains the ground potential.

The control signals CML, CPH2 attain a low level and the transistors Q8, Q7 are turned off at a time point t1. Moreover, the control signals SH, SL attain a low level. This causes the transistor Q1 to be turned on and the transistor Q2 to be turned off. Accordingly, the potential of the scan electrode SC1 rises to Vscn.

The control signal CPH attains a high level and the transistor Q3 is turned on at a time point t2. This causes the potential VFGND of the node N1 to gradually rise from the ground potential to Vset. In addition, the potential VscnF of the node N3 and the potential of the scan electrode SC1 rise from Vscn to (Vscn+Vset).

The control signal CPH attains a low level and the transistor Q3 is turned off at a time point t3. This causes the potential VFGND of the node N1 to be kept at Vset. Moreover, the potential VscnF of the node N3 and the potential of the scan electrode SC1 are kept at (Vscn+Vset).

The control signals CMH, CPH2 attain a high level and the transistors Q6, Q7 are turned on at a time point t4. This causes the potential VFGND of the node N1 to drop to Vsus. In addition, the potential VscnF of the node N3 and the potential of the scan electrode SC1 drop to (Vscn+Vsus).

The control signals SH, SL attain a high level at a time point t5. This causes the transistor Q1 to be turned off and the transistor Q2 to be turned on. Thus, the potential of the scan electrode SC1 drops to Vsus.

The control signals CMH, CEI attain a low level and the transistors Q6, Q4 are turned off at a time point t6. Moreover, the control signal CEL attains a high level, and the transistor Q5 is turned on. This causes the potential VFGND of the node N1 and the potential of the scan electrode SC1 to gradually drop toward (−Vad). In addition, the potential VscnF of the node N3 gradually drops toward (−Vad+Vscn).

The control signals SH, SL attain a low level at a time point t7. This causes the transistor Q1 to be turned on and the transistor Q2 to be turned off. Accordingly, the potential of the scan electrode SC1 rises from (−Vad+Vset2) to (−Vad+Vscn). Here, Vset2<Vscn.

The control signal CML attains a high level and the transistor Q8 is turned on at a time point t8 in the write period. This causes the node N4 to attain the ground potential. Here, since the transistor Q4 is turned off, the node N1 and the potential of the scan electrode SC1 are sustained at (−Vad+Vscn).

The control signals SH, SL attain a high level at a time point t9. This causes the transistor Q1 to be turned off and the transistor Q2 to be turned on. Accordingly, the potential of the scan electrode SC1 drops from (−Vad+Vscn) to −Vad.

The control signals SH, SL attain a low level at a time point t9a. This causes the transistor Q1 to be turned on and the transistor Q2 to be turned off. Thus, the potential of the scan electrode SC1 rises from −Vad to (−Vad+Vscn). As a result, the scan pulse is generated in the scan electrode SC1.

In this manner, the transistors Q1, Q2 of the scan IC 100 are turned on and off to cause the potential of the scan electrode SC1 to switch to the potential VFGND of the node N1 and the potential VscnF of the node N3.

Figure 7:
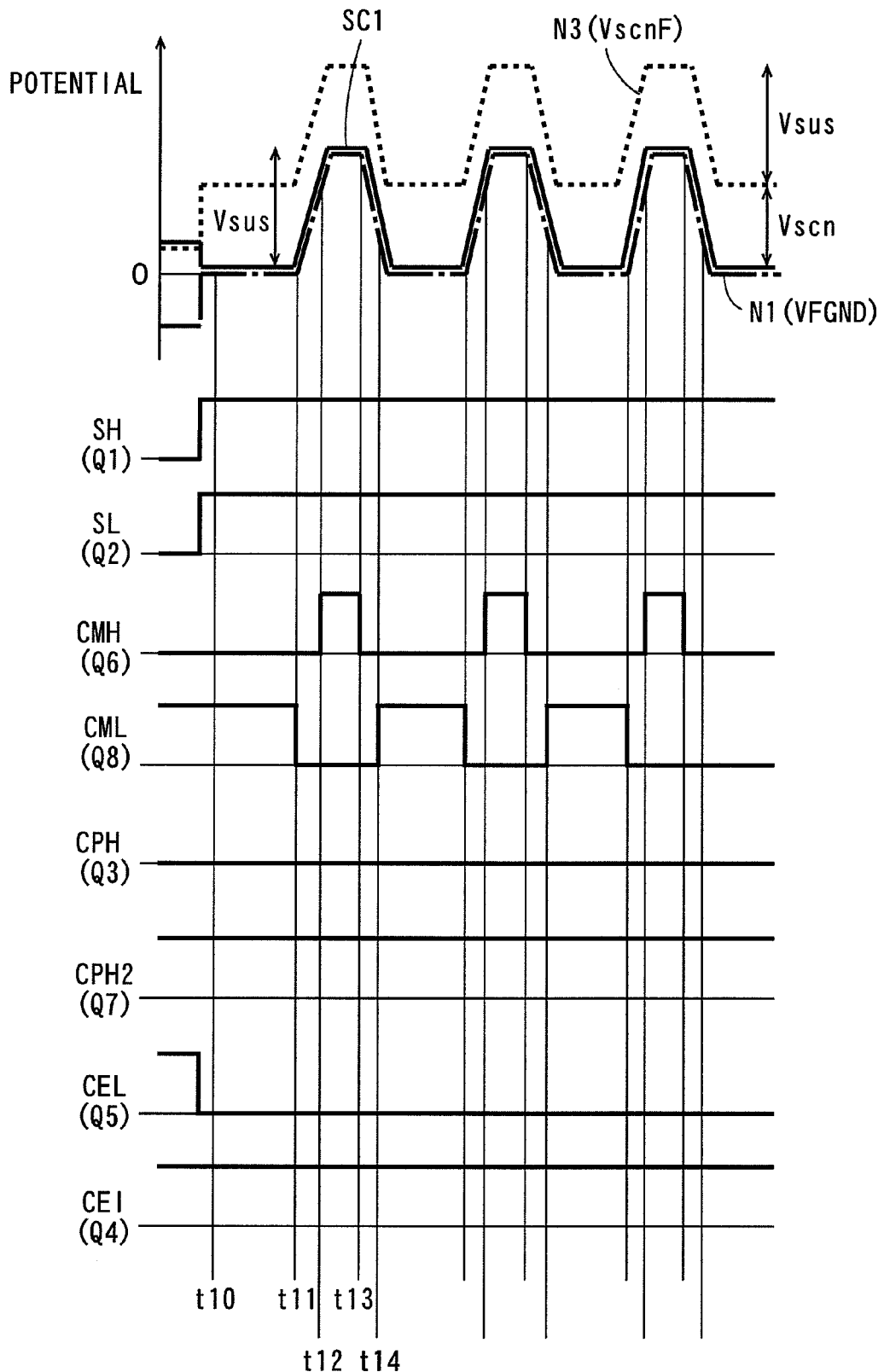
FIG. 7 is a detailed timing chart in a sustain period of the second sub-field of FIG. 4.

FIG. 7 is a detailed timing chart in the sustain period of the second sub-field of FIG. 4.

Change of the potential VFGND of the node N1 is indicated by the one-dot and dash line, change of the potential VscnF of the node N3 is indicated by the dotted line, and change of the potential of the scan electrode SC1 is indicated by the solid line in the top stage of FIG. 7. Note that the control signals SA, SB applied to the recovery circuit 400 are not shown in FIG. 7.

The control signals CMH, CPH, CEL are at a low level and the control signals SH, SL, CML, CPH2 and CEI are at a high level at a starting time point t10 of the sustain period. This causes the transistors Q1, Q6, Q3, Q5 to be turned off and the transistors Q2, Q8, Q7, Q4 to be turned on. Thus, the node N1 attains the ground potential, and the potential VscnF of the node N3 attains Vscn. Since the transistor Q2 is turned on, the potential of the scan electrode SC1 is at the ground potential.

The control signal CML attains a low level and the transistor Q8 is turned off at a time point t11. At this time, the control signal SA (see FIG. 5) attains a high level and the transistor QA is turned on. This causes a current to be supplied from the recovery capacitor CR to the node N1 and the scan electrode SC1, causing the potential VFGND of the node N1 and the potential of the scan electrode SC1 to rise.

The control signal CMH attains a high level and the transistor Q6 is turned on at a time point t12. At this time, the control signal SA (see FIG. 5) attains a low level and the transistor QA is turned off. This causes the potential VFGND of the node N1 and the potential of the scan electrode SC1 to attain Vsus. In addition, the potential VscnF of the node N3 attains (Vscn+Vsus).

The control signal CMH attains a low level and the transistor Q6 is turned off at a time point t13. At this time, the control signal SB (see FIG. 5) attains a high level and the transistor QB is turned on. Thus, the current is supplied from the node N1 and the scan electrode SC1 to the recovery capacitor CR to cause the potential VFGND of the node N1 and the potential of the scan electrode SC1 to drop.

The control signal CML attains a high level and the transistor Q8 is turned on at a time point t14. At this time, the control signal SB (see FIG. 5) attains a low level and the transistor QB is turned off. This causes the potential VFGND of the node N1 and the potential of the scan electrode SC1 to attain the ground potential. In addition, the potential VscnF of the node N3 drops to Vscn.

In this manner, the potential VFGND of the node N1 and the potential of the scan electrode SC1 alternately change between the ground potential and Vsus. In addition, the potential VscnF of the node N3 alternately change between Vscn and (Vscn+Vsus).

Note that lower stages of FIG. 4 show waveforms of the control signals CMH, CML, CPH, CPH2, CEL and the state of the scan IC 100 from the erase period of the first SF to the setup period of the third SF. "ALL-L" indicates that the transistors Q1 are turned off and the transistors Q2 are turned on in all the scan ICs 100, and "ALL-H" indicates that the transistors Q1 are turned on and the transistors Q2 are turned off in all the scan ICs 100. "DATA" indicates that the transistor Q1 is turned on and the transistor Q2 is turned off selectively in one scan IC 100 in synchronization with the write pulse Pd.

(1-6) Abnormal Pulse

Figure 8:
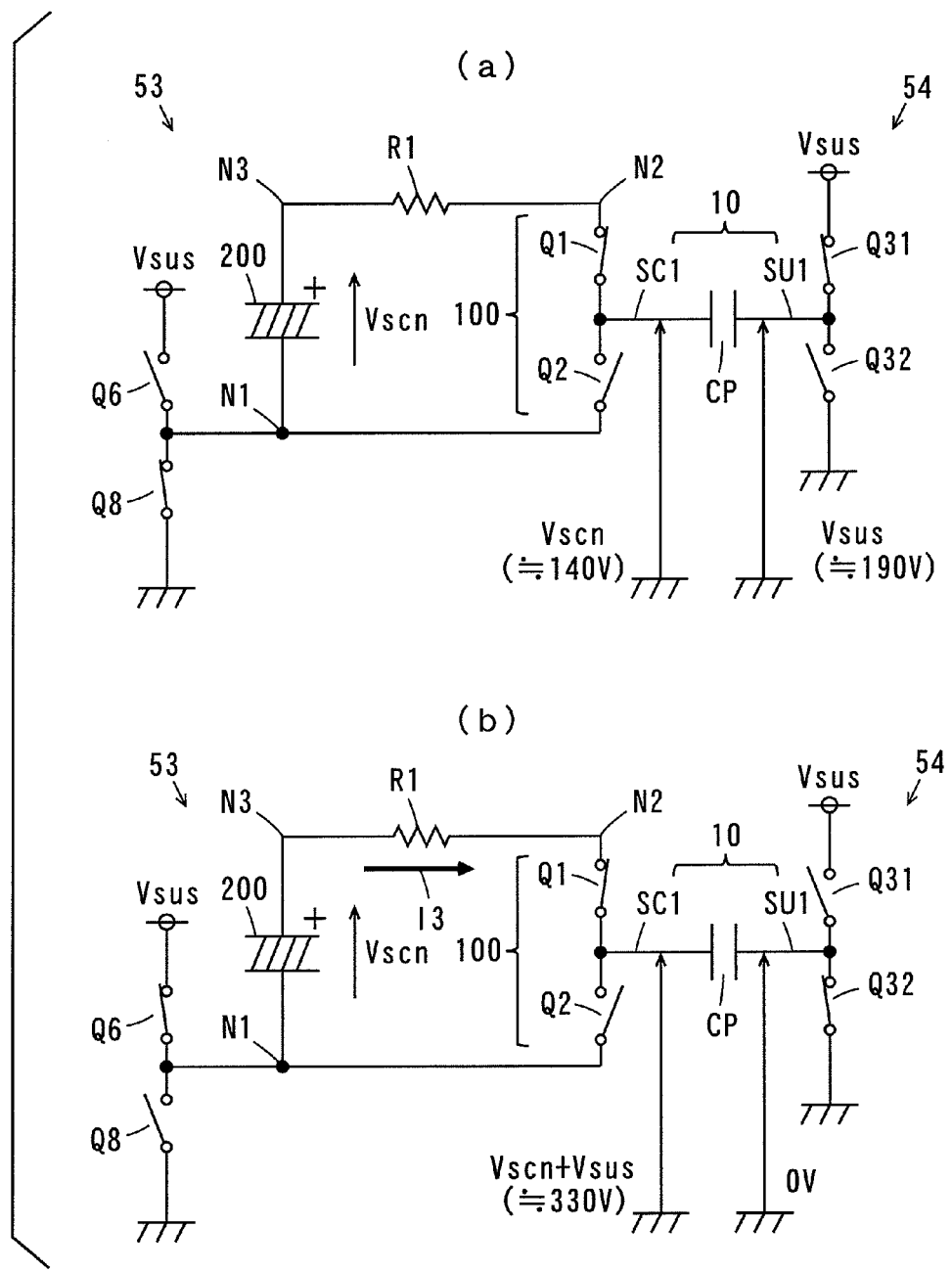
FIG. 8 is a schematic diagram for explaining a mechanism of generation of an abnormal pulse.

Next, description is made of an abnormal pulse generated in the sustain period shown in FIG. 7. FIG. 8 is a schematic diagram for explaining a mechanism of generation of the abnormal pulse. FIG. 8 shows part of the scan electrode drive circuit 53, the panel capacitance CP and the sustain electrode drive circuit 54 in a simplified manner.

As shown in FIG. 7, the transistors Q1 are turned off and the transistors Q2 are turned on in all the scan ICs 100 in the sustain period during the normal operation. In the abnormal operation, however, the transistors Q1 are turned on and the transistors Q2 are turned off in all the scan ICs 100 regardless of the pattern of the images to be displayed on the panel 10. Accordingly, discharge currents between the scan electrodes SC1 to SCn and the sustain electrodes SU1 to SUn flow through the protective resistor R1 in the sustain period during the abnormal operation.

As shown in FIG. 8 (a), when the transistor Q6 of the scan electrode drive circuit 53 is turned off and the transistor Q8 thereof is turned on, a transistor Q31 of the sustain electrode drive circuit 54 is turned on and a transistor Q32 thereof is turned off. When the transistor Q1 of the scan IC 100 is turned on and the transistor Q2 thereof is turned off because of the abnormal operation, the potential of the scan electrode SC1 is Vscn. The potential Vscn is about 140 V, for example. In addition, a potential of the sustain electrode SU1 is Vsus. The potential Vsus is about 190 V, for example. In this case, since a potential difference between the scan electrode SC1 and the sustain electrode SU1 does not exceed the discharge start voltage, a discharge is not generated in the discharge cell connected between the scan electrode SC1 and the sustain electrode SU1. This does not cause the discharge current to flow through the protective resistor R1.

As shown in FIG. 8 (b), when the transistor Q6 of the scan electrode drive circuit 53 is turned on and the transistor Q8 thereof is turned off, the transistor Q31 of the sustain electrode drive circuit 54 is turned off and the transistor Q32 thereof is turned on. When the transistor Q1 of the scan IC 100 is turned on and the transistor Q2 thereof is turned off because of the abnormal operation, the potential of the scan electrode SC1 is (Vscn+Vsus). The potential (Vscn+Vsus) is about 330 V, for example. Moreover, the potential of the sustain electrode SU1 is 0 V. In this case, since a potential difference between the scan electrode SC1 and the sustain electrode SU1 exceeds the discharge start voltage, a discharge is generated in the discharge cell connected between the scan electrode SC1 and the sustain electrode SU1. This causes a discharge current I3 to flow through the protective resistor R1.

In this manner, the potential of the sustain electrode SU1 alternately changes between Vsus and 0 V. In contrast, the potential of the scan electrode SC1 changes between Vscn and (Vscn+Vsus). Accordingly, the discharge current I3 flows only in one direction through the protective resistor R1. The discharge current I3 generates the pulse voltage at the both ends of the protective resistor R1. As described above, this pulse voltage is referred to as the abnormal pulse.

FIG. 9 is a waveform diagram showing one example of the abnormal pulse. In the example of FIG. 9, the peak of the abnormal pulse exceeds 50 V. Such an abnormal pulse is generated about 50 to 1000 times per one field (16.6 ms).

Figure 10:
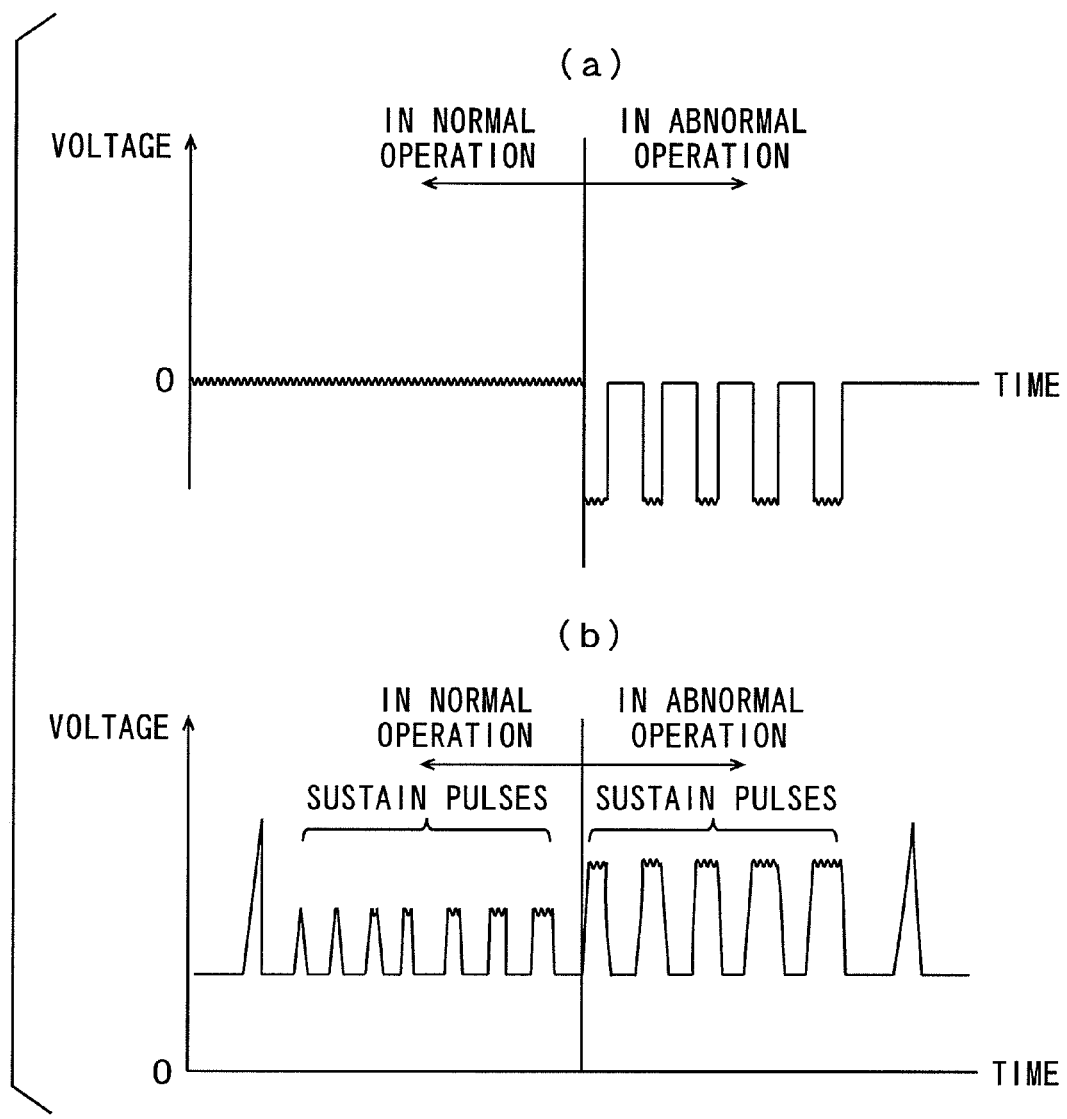
FIG. 10 (*a*) is a waveform diagram showing a voltage at both ends of a protective resistor in a normal operation and an abnormal operation, and FIG. 10 (*b*) is a waveform diagram showing a voltage of a scan electrode in the normal operation and the abnormal operation.

FIG. 10 (a) is a waveform diagram showing voltages at the both ends of the protective resistor R1 in the normal operation and the abnormal operation, and FIG. 10 (b) is a waveform diagram showing the voltage of the scan electrode SC1 in the normal operation and the abnormal operation.

In the normal operation, the current does not flow through the protective resistor R1 in the sustain period. Accordingly, a voltage amplitude at the both ends of the protective resistor R1 is substantially 0 V, as shown in FIG. 10 (a).

Meanwhile, as described above, when the transistors Q1, Q2 of the scan IC 100 are fixed in the ON state and OFF state, respectively, because of the abnormal operation, the discharge current flows in one direction through the protective resistor R1 in the sustain period. Thus, the voltage amplitude at the both ends of the protective resistor R1 significantly increases as shown in FIG. 10 (a). Moreover, the sustain pulse applied to the scan electrode SC1 rises by the voltage Vscn in the sustain period as shown in FIG. 10 (b).

The discharge current flows through the protective resistor R1 because of such an abnormal operation, so that the protective resistor R1 is heated. This may cause the protective resistor R1 to glow and solder to be molten.

Therefore, the abnormal operation of the scan IC 100 is detected by a detection circuit, described below, in the present embodiment. The power supply circuit is temporarily stopped when the abnormal operation of the scan IC 100 is detected.

(1-7) Details of the Scan IC

Figure 11:
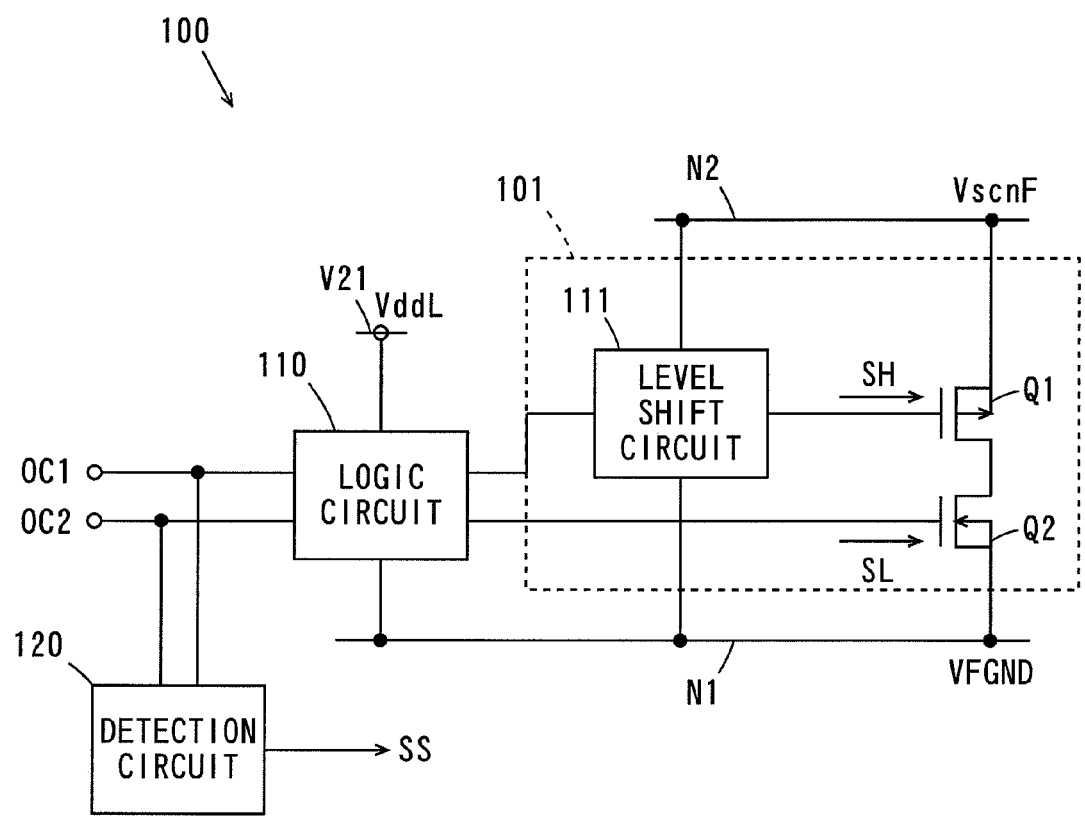
FIG. 11 is a diagram showing details of a scan IC.

Next, description is made of details of the scan IC 100. FIG. 11 is a diagram showing details of the scan IC 100. As shown in FIG. 11, each scan IC 100 includes a switch circuit 101 and a logic circuit 110. The switch circuit 101 includes the transistors Q1, Q2 and a level shift circuit 111.

The level shift circuit 111 of the switch circuit 101 is connected to the node N2 and the node N1. The logic circuit 110 is connected to a power supply terminal V21 that receives a voltage VddL and the node N1. The voltage VddL is 5 V, for example.

Control signals OC1, OC2 that change between a logical "1" (a high level in this example) and a logical "0" (a low level in this example) are applied to an input terminal of the logic circuit 110. The control signals OC1, OC2 are included in the timing signals generated by the timing generation circuit 55, and applied in common to all logic circuits 110. The logic circuit 110 applies the control signal SH to the transistor Q1 through the level shift circuit 111, and applies the control signal SL to the transistor Q2 based on the applied control signals OC1, OC2. Thus, ON/OFF of the transistors Q1, Q2 is controlled.

FIG. 12 shows correspondences between the logic of the control signals OC1, OC2 and the control states of the transistors Q1, Q2. In this example, when both the control signals OC1, OC2 are a logical "0", both the transistors Q1, Q2 are turned off and all the scan ICs 100 are in high impedance states. When the control signal OC1 is a logical "0" and the control signal OC2 is a logical "1", the transistors Q1, Q2 are controlled such that the scan pulses are sequentially applied to the scan electrodes SC1 to SCn in the write period (the state of "DATA" in FIG. 4).

When the control signal OC1 is a logical "1" and the control signal OC2 is a logical "0", all the transistors Q1 corresponding to the scan electrodes SC1 to SCn are turned off, and all the transistors Q2 corresponding to the scan electrodes SC1 to SCn are turned on (the state of "ALL-L" in FIG. 4). When both the control signals OC1, OC2 are a logical "1", all the transistors Q1 corresponding to the scan electrodes SC1 to SCn are turned on, and all the transistors Q2 corresponding to the scan electrodes SC1 to SCn are turned off (the state of "ALL-H" in FIG. 4).

(1-7-1) The Detection Circuit

As shown in FIG. 11, the detection circuit 120 is connected to the input terminal of the logic circuit 110. In the present embodiment, a plurality of detection circuits 120 are provided to correspond to the plurality of logic circuits 110, respectively. The detection circuit 120 may be provided inside or outside the scan IC 100. The detection circuit 120 detects abnormality in the scan IC 100. In the present embodiment, the detection circuit 120 outputs an abnormality detection signal SS of low level when detecting the abnormality in the scan IC.

Details of the detection circuit 120 will be described. FIG. 13 is a circuit diagram showing the configuration of the detection circuit 120. Note that the level shift circuit 111 is not shown in FIG. 13. As shown in FIG. 13, the detection device 120 includes an inverter INa, a NOR gate circuit 121, resistors R11 to R14, a capacitor 122, an NPN bipolar transistor (hereinafter abbreviated as a transistor) Q11 and a PNP bipolar transistor (hereinafter abbreviated as a transistor) Q12.

The control signal OC1 is applied to an input terminal of the inverter INa. An output signal of the inverter INa is applied to one input terminal of the NOR gate circuit 121. The control signal OC2 is applied to the other input terminal of the NOR gate circuit 121.

An output terminal of the NOR gate circuit 121 is connected to a base of the transistor Q11 through the resistor R11. A collector of the transistor Q11 is connected to a node N11, and an emitter thereof is connected to a ground terminal G11. The resistor R12 is connected between a power supply terminal V22 that receives a voltage of 5 V, for example, and the node N11, and the capacitor 122 is connected between the node N11 and the ground terminal G11. In addition, the node N11 is connected to a base of the transistor Q12 through the resistor R13.

An emitter of the transistor Q12 is connected to a power supply terminal V23 that receives a voltage of 5 V, for example, and a collector thereof is connected to a node N12. The resistor R14 is connected between the node N12 and the ground terminal G11. The abnormality detection signal SS is output from the node N12.

When the control signal OC1 is a logical "1" and the control signal OC2 is a logical "0" (the state of "ALL-L" in FIG. 12), both one input signal and another input signal of the NOR gate circuit 121 are a logical "0". In this case, an output signal of the NOR gate circuit 121 is a logical "1", and the transistor Q11 is turned on. Thus, the capacitor 122 is discharged through the transistor Q11. This causes the node N11 to be substantially at the ground potential.

In this case, a voltage between the base and the emitter of the transistor Q12 is sufficiently increased. This causes the transistor Q12 to be turned on. As a result, a potential of the node N12 is increased, and the abnormality detection signal SS of low level is not output from the node N12.

When the logic of the control signals OC1, OC2 does not apply to the example above, that is, when the control states of the transistors Q1, Q2 are "HIGH IMPEDANCE", "DATA" or "ALL-H" of FIG. 12, the output signal of the NOR gate circuit 121 is a logical "0", and the transistor Q11 is turned off.

Accordingly, the capacitor 122 is charged from the power supply terminal V22 through the resistor R12. In this case, a potential of the node N11 is gradually increased at a time constant determined by the value of the resistor R12 and the value of the capacitor 122, and the voltage between the base and the emitter of the transistor Q12 is decreased. When the voltage between the base and the emitter of the transistor Q12 is smaller than a threshold value, the transistor Q12 is turned off. As a result, the node N12 attains the ground potential, and the abnormality detection signal SS of low level is output from the node N12.

In the present embodiment, the value of the resistor R12 and the value of the capacitor 122 are set such that a time period from the time when charging of the capacitor 122 is started to the time when the transistor Q12 is turned off (hereinafter referred to as a charging duration time period) is one field period (16.67 ms).

When the scan IC 100 is in the normal operation, the transistor Q1 is turned off and the transistor Q2 is turned on in the sustain period of each sub-field as shown in FIG. 7. Therefore, the control signal OC1 is a logical "1" and the control signal OC2 is a logical "0" at least the number of times of the sub-fields in one field period (the state of "ALL-L" in FIG. 12).

Accordingly, the transistor Q11 is turned on and the capacitor 122 is discharged at least the number of times of the sub-fields in one field period. This does not cause the abnormality detection signal SS of low level to be output.

On the other hand, when the control signal OC1 of a logical "1" and the control signal OC2 of a logical "1" are applied to the logic circuit 110 because of the abnormal operation of the scan IC 100 over one field period, the transistor Q1 is fixed to ON and the transistor Q2 is fixed to OFF. In this case, since the capacitor 122 is not discharged, the potential of the node N11 is increased to cause the transistor Q12 to be turned off. As a result, the abnormality detection signal SS of low level is output.

When the abnormality detection signal SS of low level is output from any of the plurality of detection circuits 110, the operation of the power supply circuit is temporarily stopped in response in the present embodiment. This prevents the flow of currents through the protective resistor R1 (FIG. 5) over a long time period, preventing the protective resistor R1 from being abnormally heated. Since the abnormal operation of the scan IC 100 temporarily occurs, the scan IC 100 can be returned to the normal operation by temporarily turning off the power supply circuit and resetting the plasma display device.

(1-7-2) Another Configuration of the Detection Circuit

Figure 14:
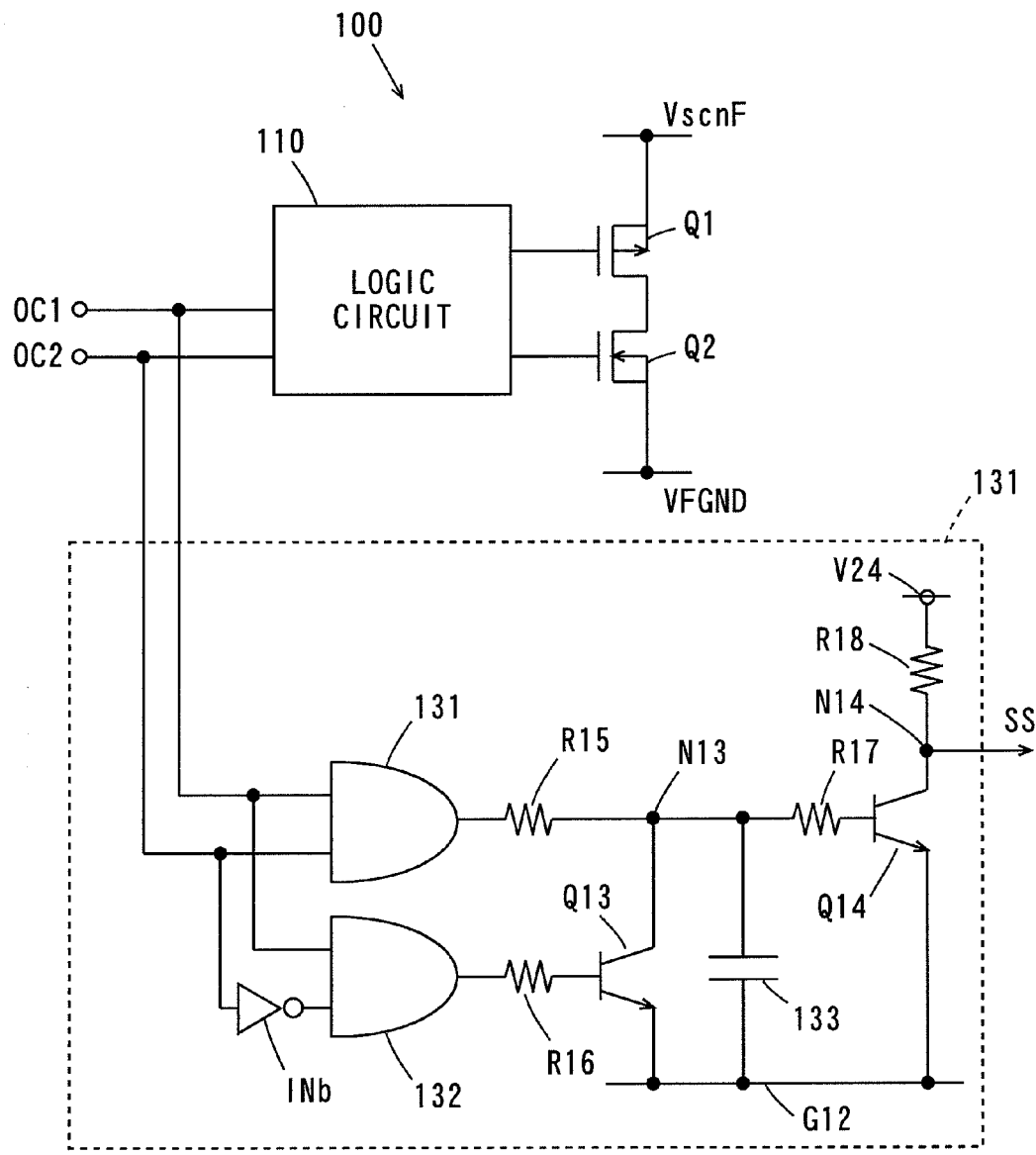
FIG. 14 is a circuit diagram showing another configuration of the detection circuit.

Next, description is made of another configuration of the detection circuit. FIG. 14 is a circuit diagram showing another configuration of the detection circuit. Note that the level shift circuit 111 is not shown in FIG. 14. A detection circuit 130 shown in FIG. 14 includes AND gate circuits 131, 132, an inverter INb, resistors R15 to R18, a capacitor 133 and NPN bipolar transistors (hereinafter abbreviated as transistors) Q13, Q14.

The control signal OC1 is applied to one input terminal of the AND gate circuit 131, and the control signal OC2 is applied to the other input terminal thereof. The control signal OC2 is applied to an input terminal of the inverter INb. The control signal OC1 is applied to one input terminal of the AND gate circuit 132, and an output signal of the inverter INb is applied to the other input terminal thereof.

An output terminal of the AND gate circuit 131 is connected to a node N13 through the resistor R15. An output terminal of the AND gate circuit 132 is connected to a base of the transistor Q13 through the resistor R16. A collector of the transistor Q13 is connected to the node N13, and an emitter thereof is connected to a ground terminal G12. The node N13 is connected to a base of the transistor Q14 through the resistor R17. The capacitor 133 is connected between the node N13 and the ground terminal G12.

A collector of the transistor Q14 is connected to a node N14, and an emitter thereof is connected to the ground terminal G12. The resistor R18 is connected between a power supply terminal V24 that receives a voltage of 5 V, for example, and the node N14. The abnormality detection signal SS of low level is output from the node N14.

When the control signal OC1 is a logical "1" and the control signal OC2 is a logical "0" (the state of "ALL-L" in FIG. 12), the output signal of the AND gate circuit 131 is a logical "0", and the output signal of the AND gate circuit 132 is a logical "1". In this case, the transistor Q13 is turned on, and the capacitor 133 is discharged through the transistor Q13. This causes the node N13 to be substantially at the ground potential.

In this case, the voltage between the base and the emitter of the transistor Q14 is decreased. When the voltage between the base and the emitter of the transistor Q14 is smaller than the threshold value, the transistor Q14 is turned off. As a result, a potential of the node N14 is increased, so that the abnormality detection signal SS of low level is not output from the node N14.

When the control signal OC1 is a logical "1" and the control signal OC2 is a logical "1" (the state of "ALL-H" in FIG. 12), the output signal from the AND gate circuit 131 is a logical "1", and the output signal of the AND gate circuit 132 is a logical "0". In this case, the transistor Q13 is turned off and the capacitor 133 is charged from the output terminal of the AND gate circuit 131 through the resistor R15.

In this case, a potential of the node N13 is gradually increased at a time constant determined by the value of the resistor R15 and the value of the capacitor 133, and the voltage between the base and the emitter of the transistor Q14 is increased. When the voltage between the base and the emitter of the transistor Q14 is not less than the threshold value, the transistor Q14 is turned on. As a result, the node N14 is substantially at the ground potential, and the abnormality detection signal SS of low level is output from the node N14.

When the logic of the control signals OC1, OC2 does not apply to the examples above, that is, when the control states of the transistors Q1, Q2 are "HIGH IMPEDANCE" or "DATA" of FIG. 12, both the output signals of the AND gate circuits 131, 132 are a logical "0". In this case, the capacitor 133 is not charged or discharged.

In the present embodiment, the value of the resistor R15 and the value of the capacitor 133 are set such that a time period from the time when charging of the capacitor 133 is started to the time when the transistor Q14 is turned off (a charging duration time period) is one field period (16.67 ms).

As described above, when the scan IC 100 is in the normal operation, the control signal OC1 is a logical "1" and the control signal OC2 is a logical "0" at least the number of times of the sub-fields in one field period. Therefore, the transistor Q13 is turned on and the capacitor 133 is discharged at least the number of times of the sub-fields in one field period. Accordingly, the abnormality detection signal SS of low level is not output.

On the other hand, when the control signal OC1 of a logical "1" and the control signal OC2 of a logical "1" are applied to the logic circuit 110 over one field period because of the abnormal operation of the scan IC 100, the transistor Q1 is fixed to ON and the transistor Q2 is fixed to OFF. In this case, the capacitor 133 is not discharged, so that the potential of the node N13 is increased to cause the transistor Q14 to be turned on. As a result, the abnormality detection signal SS of low level is output.

Similarly to the case of using the foregoing detection circuit 120 (FIG. 13), when the abnormality detection signal SS of low level is output from any of the plurality of detection circuits 130, the operation of the power supply circuit is temporarily stopped in response. This prevents the flow of currents through the protective resistor R1 (FIG. 5) over a long time period, preventing the protective resistor R1 from being abnormally heated.

Note that the detection circuits 120, 130 shown in FIGS. 13 and 14 can be provided either inside or outside the scan IC 100. In the case of providing the detection circuits 120, 130 outside the scan IC 100, the detection circuits 120, 130 are configured to be attachable to or removable from the scan IC 100 while the scan IC 100 is not disassembled or the design of the scan IC 100 is not changed. Accordingly, cost and working time required for attaching or removing the detection circuits 120, 130 can be reduced.

(1-8) Still Another Configuration of the Detection Circuit

Next, description is made of still another configuration of the detection circuit. FIG. 15 is a circuit diagram showing still another configuration of the detection circuit. Note that the detection circuit 140 of FIG. 15 may be formed inside the scan IC 100.

The detection circuit 140 includes an NPN bipolar transistor (hereinafter abbreviated as a transistor) Q15, an NPN bipolar transistor (hereinafter abbreviated as a transistor) Q16, resistors R19 to R21 and a capacitor 141.

A base of the transistor Q15 is connected to another output terminal of the logic circuit 110 through the resistor R19. A collector of the transistor Q15 is connected to a node N15, and an emitter thereof is connected to the node N1. The capacitor 141 is connected between the node N15 and the node N1.

A node N16 is connected to the power supply terminal V21. The resistor R20 is connected between the node N15 and the node N16. The node N15 is connected to a base of the transistor Q16. An emitter of the transistor Q16 is connected to the node N16, and a collector thereof is connected to a node N17. The resistor R21 is connected between the node N17 and the node N1. The abnormality detection signal SS of low level is output from the node N17.

The control signal SL is applied to the base of the transistor Q15. When the control signal SL attains a high level, the transistor Q15 is turned on. This causes the capacitor 141 to be discharged through the transistor Q15. Accordingly, the node N15 is substantially at the ground potential.

In this case, the voltage between the base and the emitter of the transistor Q16 is sufficiently increased. This causes the transistor Q16 to be turned on. As a result, a potential of the node N17 is increased, and the abnormality detection signal SS of low level is not output from the node N17.

When the control signal SL attains a low level, the transistor Q15 is turned off. Thus, the capacitor 141 is charged from the power supply terminal V21 through the resistor R20. In this case, a potential of the node N15 is increased at a time constant determined by the value of the resistor R20 and the value of the capacitor 141, and the voltage between the base and the emitter of the transistor Q16 is decreased. When the voltage between the base and the emitter of the transistor Q16 is smaller than the threshold value, the transistor Q16 is turned off. As a result, the node N17 attains a ground potential, and the abnormality detection signal SS of low level is output from the node N17.

In the present embodiment, the value of the resistor R20 and the value of the capacitor 141 are set such that a time period from the time when charging of the capacitor 141 is started to the time when the transistor Q16 is turned off (a charging duration time period) is one field period (16.67 ms).

As described above, when the scan IC 100 is in the normal operation, the transistor Q1 is turned off and the transistor Q2 is turned on in the sustain period of each sub-field. Therefore, the transistor Q15 is turned on and the capacitor 141 is discharged at least the number of times of the sub-fields in one field period. Thus, the abnormality detection signal SS of low level is not output.

On the other hand, when the transistor Q1 is fixed to ON and the transistor Q2 is fixed to OFF over one field period because of the abnormal operation of the scan IC 100, the capacitor 122 is not discharged. Therefore, the potential of the node N15 is increased to cause the transistor Q16 to be turned off. As a result, the abnormality detection signal SS of low level is output.

Similarly to the case of using the foregoing detection circuit 120 (FIG. 13), when the abnormality detection signal SS of low level is output from any of the plurality of detection circuits 140, the operation of the power supply circuit is temporarily stopped in response. This prevents the flow of currents through the protective resistor R1 (FIG. 5) over a long time period, preventing the protective resistor R1 from being abnormally heated.

(1-9) Power Supply Abnormality Detection Circuit

The abnormality detection signal SS caused by the detection circuits 120, 130, 140 of the foregoing embodiment and an abnormality detection signal caused by a voltage abnormality detection circuit that detects a voltage abnormality of the DC power supply 200 (FIG. 5) can be provided in common.

Figure 16:
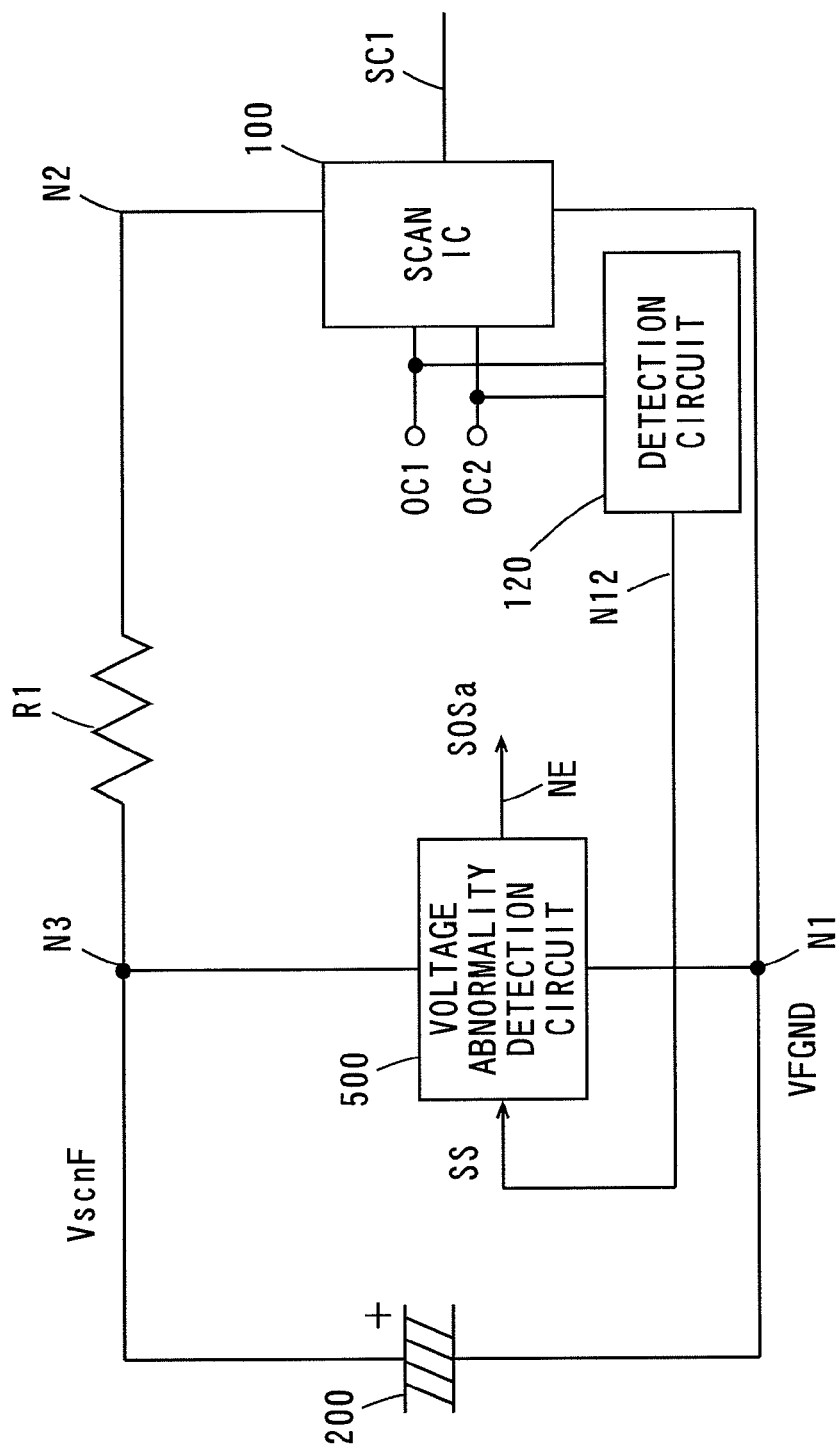
FIG. 16 is a block diagram showing the configurations of the detection circuit and a voltage abnormality detection circuit in which an abnormality detection signal is used in common.
Figure 17:
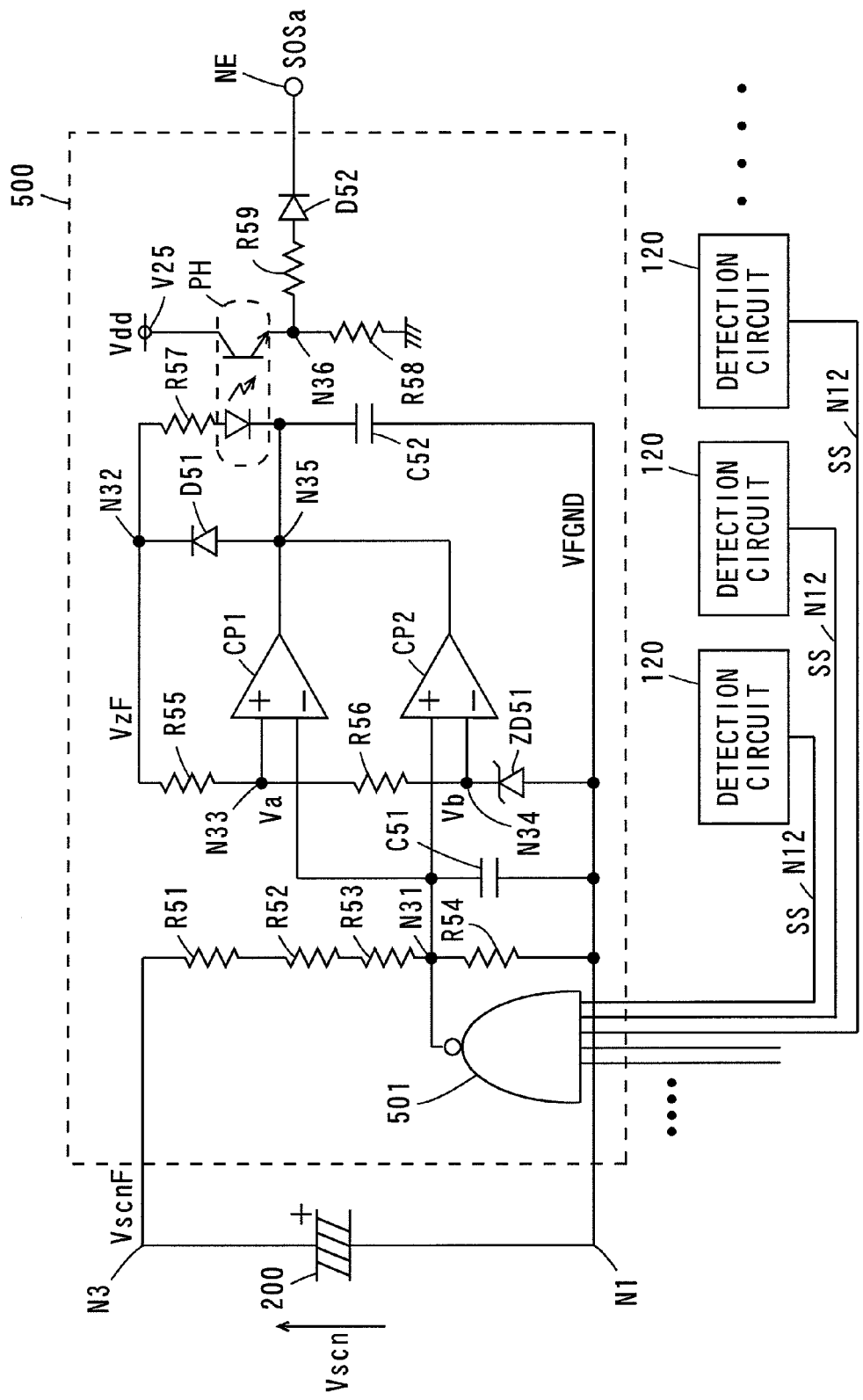
FIG. 17 is a circuit diagram showing the configuration of the voltage abnormality detection circuit.

FIG. 16 is a block diagram showing the configurations of the detection circuit and the voltage abnormality detection circuit in which the abnormality detection signal is used in common. FIG. 17 is a circuit diagram showing the configuration of the voltage abnormality detection circuit. FIGS. 16 and 17 show the configuration when the detection circuit 120 (see FIG. 13) is used.

As shown in FIG. 16, the voltage abnormality detection circuit 500 is connected between the node N1 and the node N3. The abnormality detection signal SS output from the node N12 of the detection circuit 120 is applied to the voltage abnormality detection circuit 500. An abnormality detection signal SOSa is output from a node NE of the voltage abnormality detection circuit 500. Note that FIG. 16 only shows one scan IC 100 of the plurality of scan ICs 100 and one detection circuit 120 of the plurality of detection circuits 120.

As shown in FIG. 17, the voltage abnormality detection circuit 500 includes resistors R51 to R59, a NAND gate circuit 501, capacitors C51, C52, a zener diode ZD51, diodes D51, D52, comparators CP1, CP2 and a photocoupler PH.

The nodes N12 of the plurality of detection circuits 120 are connected to an input terminal of the NAND gate circuit 501. An output terminal of the NAND gate circuit 501 is connected to a node N31. The resistors R51 to R53 are connected in series between the node N3 and the node N31, and the resistor R54 is connected between the node N31 and the node N1. The capacitor C51 is connected between the node N31 and the node N1. The resistor R55 is connected between a node N32 and a node N33, and the resistor R56 is connected between the node N33 and a node N34. The zener diode ZD51 is connected between the node N34 and the node N1.

One input terminal of the comparator CP1 is connected to the node N33, and the other input terminal thereof is connected to the node N31. One input terminal of the comparator CP2 is connected to the node N31, and the other input terminal thereof is connected to the node N34. Output terminals of the comparators CP1, CP2 are connected to a node N35. The resistor R57 and a light emitting diode of the photocoupler PH are connected in series between the node N32 and the node N35. The capacitor C52 is connected between the node N35 and the node N1.

A photo transistor of the photocoupler PH is connected between a power supply terminal V25 that receives a voltage Vdd and a node N36. The resistor R58 is connected between the node N36 and the ground terminal, and the resistor R59 and the diode D52 are connected in series between the node N36 and the node NE.

As described above, the potential VscnF of the node N3 is a potential (VFGND+Vscn), which is higher than the potential VFGND of the node N1 by the voltage Vscn. A potential VzF of the node N32 is (VFGND+Vz). Here, Vz is a constant voltage. A potential Va of the node 33 is higher than a potential Vb of the node N34.

When the voltage Vscn held by the DC power supply 200 is within a normal range, a potential of the node N31 is higher than the potential Vb of the node N34 and lower than the potential Va of the node N33. This causes the potentials of the output terminals of the comparators CP1, CP2 to attain a high level. In this case, the current does not flow through the light emitting diode of the photocoupler PH, and the light emitting diode does not emit light. Thus, the phototransistor of the photocoupler PH is not turned on. As a result, a potential of the node N36 is low, and a potential of the node NE attains a low level.

On the other hand, when the voltage Vscn held by the DC power supply 200 is higher than the upper limit of the normal range, the potential of the node N31 is higher than the potential Va of the node N33. This causes the potential of an output terminal of the comparator CP1 to attain a low level. In this case, the current flows through the light emitting diode of the photocoupler PH, and the light emitting diode emits light. Accordingly, the phototransistor of the photocoupler PH is turned on. As a result, the potential of the node N36 is increased, and the abnormality detection signal SOSa of high level is output from the node NE.

When the voltage Vscn generated by the DC power supply 200 is lower than the lower limit of the normal range, the potential of the node N31 is lower than the potential Vb of the node N34. This causes the potential of the output terminal of the comparator CP2 to attain a low level. In this case, the current flows through the light emitting diode of the photocoupler PH, and the light emitting diode emits light. This causes the phototransistor of the photocoupler PH to be turned on. As a result, the potential of the node N36 is increased, and the abnormality detection signal SOSa of high level is output from the node NE.

Furthermore, when the abnormality detection signal SS of low level is output from any of the plurality of detection circuits 120, the output signal of the NAND gate circuit 501 attains a high level, and the potential of the node N31 is higher than the potential Va of the node N33. Thus, the potential of the output terminal of the comparator CP1 attains a low level. In this case, the current flows through the light emitting diode of the photocoupler PH, and the light emitting diode emits light. This causes the phototransistor of the photocoupler PH to be turned on. As a result, the potential of the node N36 is increased, and the abnormality detection signal SOSa of high level is output from the node NE.

In this manner, the abnormality detection signal SS of the detection circuit 120 and the abnormality detection signal SOSa of the voltage abnormality detection circuit 500 can be provided in common. Thus, the number of components and the number of assembling steps are reduced. As a result, the plasma display device can be reduced in cost.

Note that the abnormality detection signal SS and the abnormality detection signal SOSa can be used in common also when the detection circuits 130, 140 are used instead of the detection circuit 120. Accordingly, the plasma display device can be reduced in cost.

(1-10) Modifications

While one logic circuit 110 is provided corresponding to one switch circuit 101 in the foregoing embodiment, one common logic circuit 110 may be provided corresponding to a plurality of (60 to 70, for example) switch circuits 101. In the case, another control signal is applied to the common logic circuit 120, 130 for outputting the control signals SH, SL to the plurality of switch circuits 101, respectively.

While the plurality of detection circuits 120, 130 are provided corresponding to the plurality of logic circuits 110, respectively, in the foregoing embodiment, the common detection circuit 120, 130 may be provided for the plurality of logic circuits 110.

However, erroneous control signals OC1, OC2 may be applied to part of the plurality of logic circuits 110 because of noise, short circuits of wirings or the like. Thus, the plurality of detection circuits 120, 130 may be provided to correspond to the plurality of logic circuits 110, respectively.

In addition, the abnormality detection signal SS is output when the control states of the transistors Q1, Q2 are not "ALL-L" over one field period in the detection circuit 120, 130, 140 of the foregoing embodiment; however, an output timing of the abnormality detection signal SS is not limited to this.

As described above, when the scan IC 100 is in the normal operation, the control states of the transistors Q1, Q2 enter "ALL-L" at least once in each sub-field. Therefore, the abnormality detection signal SS may be output when the control states of the transistors Q1, Q2 do not enter "ALL-L" over one sub-field period. Specifically, the time constants determined by the values of the resistors R12, R15, R20 and the values of the capacitors 122, 133, 141 are set such that the charging duration time period is maximized in one sub-field in the detection circuits 120, 130, 140.

When the abnormal operation of the scan IC 100 does not cause a problem of heating of the protective resistor R1 in such a short time period as one field period, the abnormality detection signal SS may be output when the control states of the transistors Q1, Q2 do not enter "ALL-L" for several seconds to several minutes, for example.

Moreover, while the detection circuits 120, 130, 140 are configured such that the abnormality detection signal SS of low level is output at the time of the abnormal operation of the scan. IC 100 in the foregoing embodiment, conversely, the detection circuits 120, 130, 140 may be configured such that the abnormality detection signal SS of high level is output at the time of the abnormal operation.

(2) Second Embodiment

Next, description will be made of a plasma display device according to a second embodiment of the present invention by referring to differences from the plasma display device according to the first embodiment.

(2-1) Configuration of the Plasma Display Device

Figure 18:
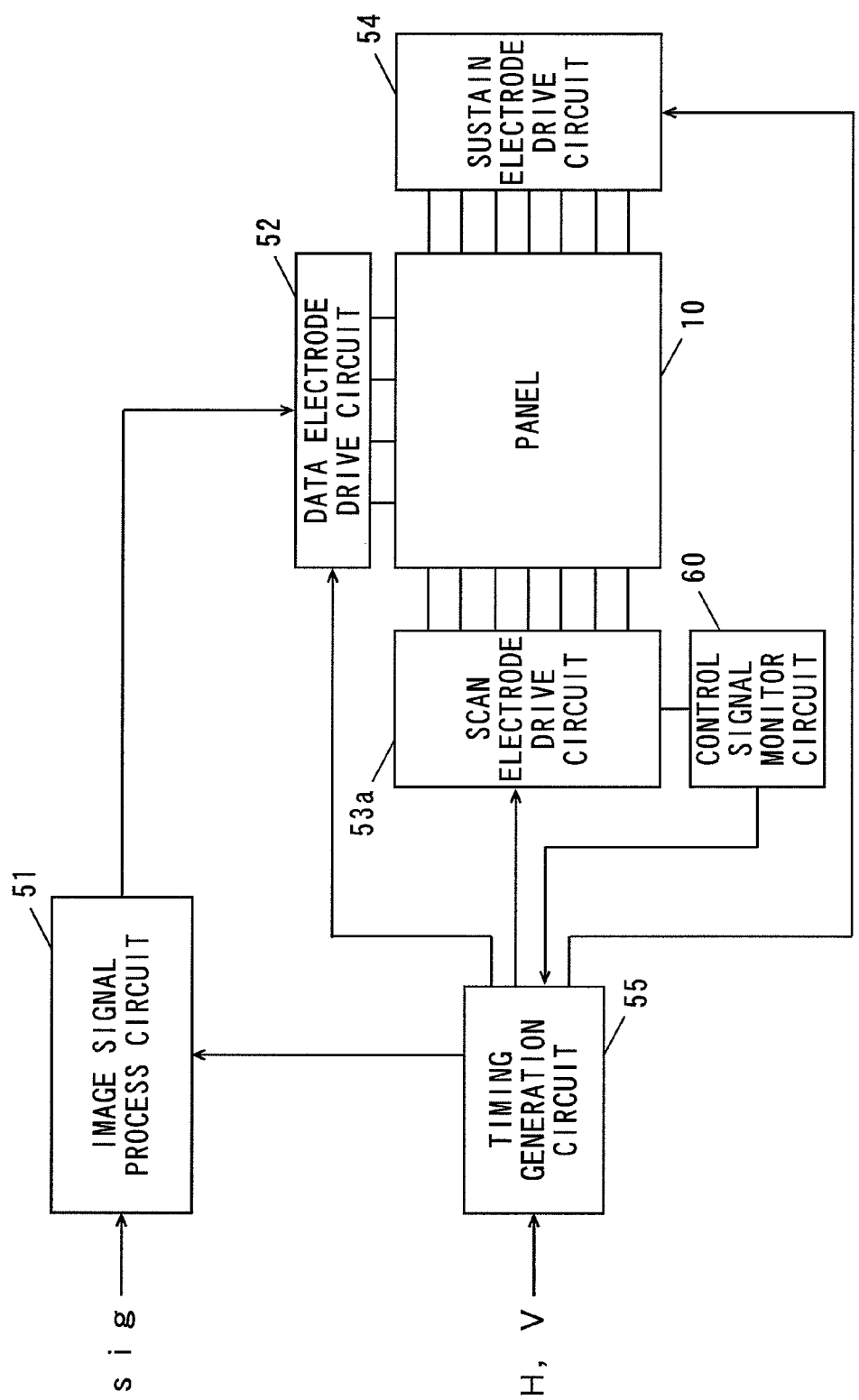
FIG. 18 is a circuit block diagram of a plasma display device according to a second embodiment.

FIG. 18 is a circuit block diagram of the plasma display device according to the second embodiment. As shown in FIG. 18, the plasma display device according to the present embodiment includes a scan electrode drive circuit 53a instead of the scan electrode drive circuit 53 of FIG. 3. A control signal monitor circuit 60 is connected to the scan electrode drive circuit 53a. The control signal monitor circuit 60 monitors whether or not a predetermined control signal is appropriately transmitted from the timing generation circuit 55 to the scan electrode drive circuit 53a, and applies a detection signal according to the result to the timing generation circuit 55. Details of the control signal monitor circuit 60 will be described below.

(2-2) Configuration of the Scan Electrode Drive Circuit

FIG. 19 is a circuit diagram showing the configuration of the scan electrode drive circuit 53a of the plasma display device according to the embodiment of the present invention. As shown in FIG. 19, the scan electrode drive circuit 53a includes a setup voltage generator 41, a sustain pulse generator 42 and a scan pulse generator 43.

The scan pulse generator 43 includes a switch 44, a power supply E43, switching elements QH1 to QHn and switching elements QL1 to QLn.

The switch 44 is connected between a node N41 and a power supply terminal V31 that receives the negative voltage (−Va). The switch 44 is turned on to cause the node N41 to be connected to the power supply terminal V31.

The power supply E43 is connected between the node N41 and a node N42. The switching elements QH1 to QHn are connected between the scan electrodes SC1 to SCn and the node N42, respectively, and the switching elements QL1 to QLn are connected between the scan electrodes SC1 to SCn and the node N42, respectively.

Note that the switching elements QH1 to QHn correspond to the transistor Q1 in the first embodiment, and the switching elements QL1 to QLn correspond to the transistor Q2 in the first embodiment.

The switching elements QH1 to QHn are turned on to cause a voltage on a high voltage side of the power supply E43 to be applied to the scan electrodes SC1 to SCn. The switching elements QL1 to QLn are turned on to cause a voltage on a low voltage side of the power supply E43 to be applied to the scan electrodes SC1 to SCn.

The switching elements QH1 to QHn and the switching elements QL1 to QLn constitute a plurality of scan ICs. For example, 64 of the switching elements QH1 to QHn and 64 of the switching elements QL1 to QLn are integrated as one monolithic IC to constitute one scan IC. When n=768, 12 scan ICs are provided, and the 12 scan ICs drive the scan electrodes SC1 to SC768. Hereinafter, the 12 scan ICs provided when n=768 are represented as the scan IC1, the scan IC2, ..., and the scan IC12, respectively, when required.

As described above, a plurality of switching elements of the switching elements QH1 to QHn, QL1 to QLn are integrated as one scan IC, so that the scan electrode drive circuit 53a can be made compact. In addition, a mounting area of the scan ICs is reduced, allowing for cost reduction.

The setup voltage generator 41 and the sustain pulse generator 42 are connected to the node N41 of the scan pulse generator 43.

In the setup period, the setup voltage generator 41 generates a drive voltage waveform that causes a potential of the node N41 of the scan pulse generator 43 (hereinafter referred to as a reference potential A) to rise or drop in the form of a ramp. At this time, the switching elements QH1 to QHn of the scan pulse generator 43 are turned off and the switching elements QL1 to QLn are turned on to cause the drive voltage waveform to be applied to the scan electrodes SC1 to SCn through the switching elements QL1 to QLn.

Moreover, the switching elements QH1 to QHn are turned on and the switching elements QL1 to QLn are turned off to cause the drive voltage waveform on which the voltage of the power supply E43 is superimposed to be applied to the scan electrodes SC1 to SCn through the switching elements QH1 to QHn.

Note that the setup voltage generator 41 corresponds to the transistors Q3, Q4, Q6 to Q8 and the power supply terminals V11, V13 of FIG. 5.

In the sustain period, the sustain pulse generator 42 generates the sustain pulse that alternately changes the reference potential A between Vsus (see FIG. 4) and the ground potential. At this time, the switching elements QH1 to QHn of the scan pulse generator 43 are turned off, and the switching elements QL1 to QLn are turned on to cause the sustain pulse to be applied to each of the scan electrodes SC1 to SCn through the switching elements QL1 to QLn.

Note that the sustain pulse generator 42 corresponds to the transistors Q6 to Q8, the power supply terminal V13 and the recovery circuit 400 of FIG. 5.

In this manner, various drive voltage waveforms are applied to the scan electrodes SC1 to SCn through the scan ICs. Particularly, the sustain pulses with the number corresponding to luminance weights are applied to the scan electrodes SC1 to SCn through the scan ICs in the sustain period. At this time, a large sustain discharge current caused by a sustain discharge of the corresponding discharge cell flows through each scan IC. Therefore, the circuit of the scan pulse generator 43 is designed such that an impedance of a path from the sustain pulse generator 42 to the scan electrodes SC1 to SCn through the switching elements QL1 to QLn is decreased to the minimum.

(2-3) Details of the Scan ICs

Figure 20:
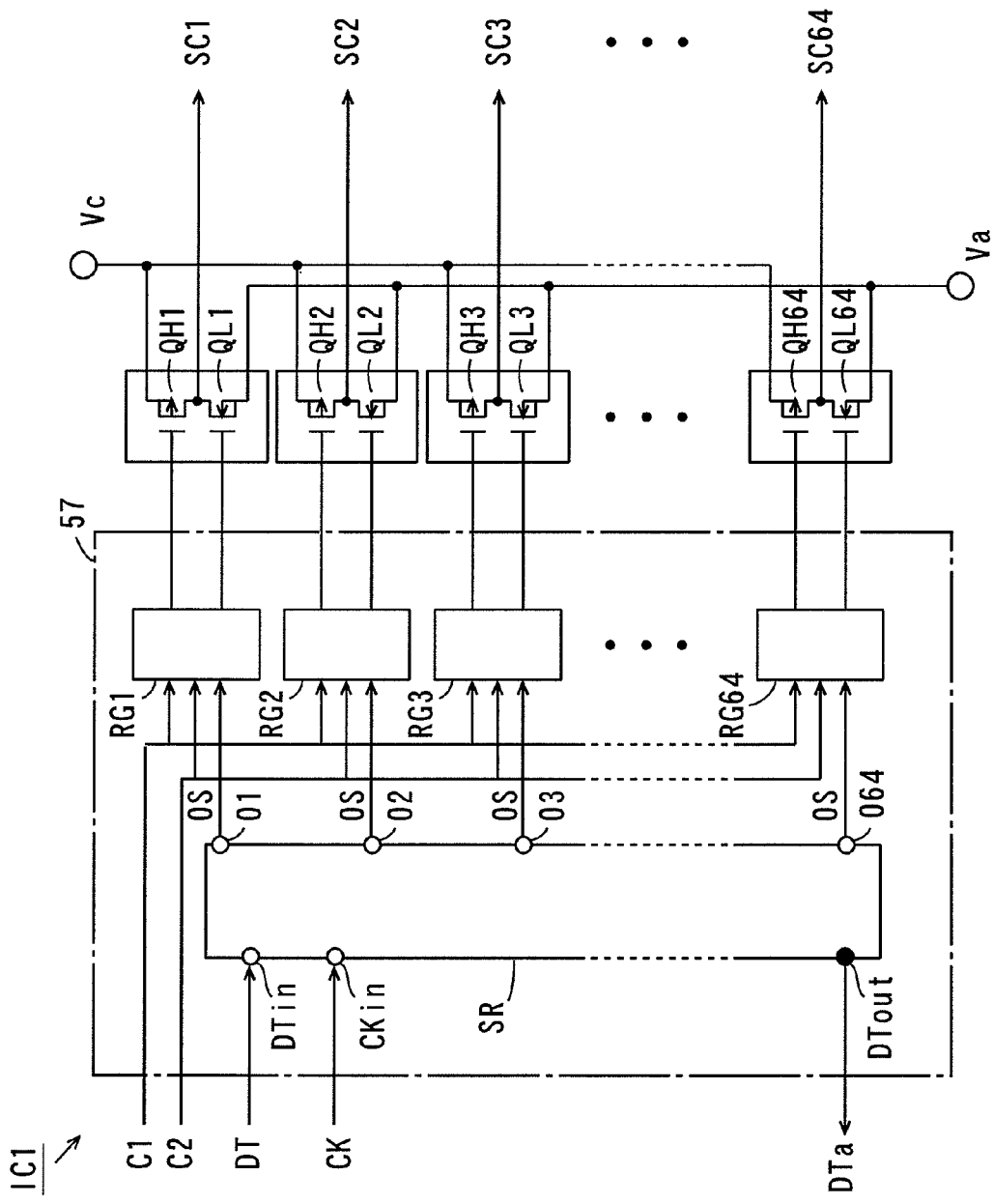
FIG. 20 is a circuit block diagram showing details of the scan IC in the embodiment of the present invention.

FIG. 20 is a circuit block diagram showing details of the scan IC in the embodiment of the present invention. FIG. 20 shows the scan IC 1 including the switching elements QH1 to QH64, QL1 to QL64.

As shown in FIG. 20, the scan IC 1 includes a switching element controller 57 for controlling the switching elements QH1 to QH64, QL1 to QL64 in addition to the switching elements QH1 to QH64, QL61 to QL64. The switching element controller 57 includes output controllers RG1 to RG64 corresponding to the switching elements QH1 to QH64, QL1 to QL64, respectively, and a shift resistor SR.

The shift resistor SR includes a data input terminal DTin, a clock input terminal CKin, output terminals O1 to O64 and a data output terminal DTout. A control signal DT is input to the data input terminal DTin, and a clock signal CK is input to the clock input terminal CK. In addition, a control signal OS is output from each of the output terminals O1 to O64, and a transmission signal DTa is output from the data output terminal DTout.

In this example, the control signal DT, the clock signal, the control signal OS and the transmission signal DTa are binary data that change between a high level and a low level. Note that the control signal DT and the clock signal CK are included in the timing signal generated by the timing generation circuit 55 of FIG. 18.

The shift resistor SR stores 64 binary data. The binary data are output from the respective output terminals O1 to O64 as the control signals OS to be applied to the output controllers RG1 to RG64. In addition, the 64 binary data stored in the shift resistor SR are updated one by one to binary data input as the control signal DT for each input of the positive pulse to the clock input terminal CKIn as the clock signal CK, for example.

The foregoing control signals OS1 to OS64 and control signals C1, C2 are input to the output controllers RG1 to RG64. The control signals C1, C2 change between a high level and a low level. Note that the control signals C1, C2 correspond to the control signals OC1, OC2 in the first embodiment, and included in the timing signal generated by the timing generation circuit 55 of FIG. 18.

The output controllers RG1 to RG64 control ON/OFF of the switching elements QH1 to QH64, QL1 to QL64 according to the corresponding control signals OS1 to OS64 and control signals OC1, OC2.

The configuration of each of the scan IC2 to the scan IC 12 is the same as that of the scan IC 1. That is, the scan IC2 to the scan IC12 are provided with output controllers RG65 to RG768 corresponding to the switching elements QH65 to QH768, QL65 to QL768 and the shift resistors SR, respectively.

In the write period, a pulse of binary data (a negative pulse, for example) serving as the base of the scan pulse is input to the data input terminal DTin of the shift resistor SR of the scan IC1 as the control signal DT. Then, the positive pulse is continuously input to the clock input terminal CK as the clock signal CK. Thus, the pulse input to the data input terminal DTin as the control signal DT is output to the output controllers RG1 to RG64 as the sequential control signal OS.

When the pulse is output to all the output controllers RG1 to RG64, the same pulse is output from the data output terminal DTout as the transmission signal DTa. The transmission signal DTa output from the data output terminal DTout is input to the data input terminal DTin of a next scan IC (the scan IC2, for example).

In this manner, the transmission signal DTa output from the data output terminal DTout of the scan ICi (i=1 to 11) is input to the data input terminal DTin of a next scan IC (i+1). Thus, a pulse serving as the base of the sequential scan pulse is applied to the output controllers RG1 to RG768.

FIG. 21 is a diagram showing a relationship between the control signals C1, C2 and control states of the switching elements QH1 to QHn, QL1 to QLn. ON/OFF of the switching elements QH1 to QHn, QL1 to QLn is controlled by the output controllers RG1 to RGn according to the control signals C1, C2 from the timing generation circuit 55 and the control signal OS from the shift resistor SR. In the following description, a low level is abbreviated as "L" and a high level is abbreviated as "H".

As shown in FIG. 21, when both the control signals C1, C2 are "L", the switching elements QH1 to QHn, QL1 to QLn are turned off regardless of the control signal OS from the shift resistor SR, and all the scan ICs are brought into high impedance states.

When the control signal C1 is "L" and the control signal C2 is "H", the switching elements QH1 to QHn, QL1 to QLn are controlled according to the control signal OS from the shift resistor SR (the state of "DATA" in FIG. 4).

Specifically, when the control signal OS output from an output terminal Oj (j=1 to n) of the shift resistor SR is "H", the corresponding switching element QHj is turned on, and the corresponding switching element QLj is turned off. In addition, when the control signal OS output from the output terminal Oj of the shift resistor SR is "L", the corresponding switching element QHj is turned off, and the corresponding switching element QLj is turned on.

When the control signal C1 is "H" and the control signal C2 is "L", the switching elements QH1 to QHn are turned off and the switching elements QL1 to QLn are turned on regardless of the control signal OS from the shift resistor SR (the state of "ALL-L" in FIG. 4).

In addition, when both the control signals C1, C2 are "H", the switching elements QH1 to QHn are turned on and the switching elements QL1 to QLn are turned off (the state of "ALL-H" in FIG. 4) regardless of the control signal OS from the shift resistor SR.

For example, both the control signals C1, C2 attain "H" in the first half of the setup period in a predetermined sub-field. Thus, the switching elements QH1 to QHn are turned on, and the switching elements QL1 to QLn are turned off. In the state, the rising ramp voltage is generated by the setup voltage generator 41. In this case, the rising ramp voltage on which the voltage of the power supply E43 is superimposed is applied to the scan electrodes SC1 to SCn through the switching elements QH1 to QHn.

The control signal C1 attains "H" and the control signal C2 attains "L" in the second half of the setup period, for example. Thus, the switching elements QH1 to QHn are turned off and the switching elements QL1 to QLn are turned on. In the state, the dropping ramp voltage is generated by the setup voltage generator 41. In this case, the dropping ramp voltage is applied to the scan electrodes SC1 to SCn through the switching elements QL1 to QLn.

The method of controlling the switching elements QH1 to QHn, QL1 to QLn in the setup period is not limited to the foregoing example. For example, the control signal C1 may attain "H" and the control signal C2 may attain "L" also in the first half of the setup period, and the rising ramp voltage generated by the setup voltage generator 41 may be applied to the scan electrodes SC1 to SCn through the switching elements QL1 to QLn.

In the write period, the control signal C1 attains "L" and the control signal C2 attains "H". Therefore, the switching elements QH1 to QHn, QL1 to QLn are controlled according to the control signal OS from the shift resistor SR.

All the binary data stored in each shift resistor SR is "H" before the start of the write period. In the state, the "L" pulse is input to the data input terminal DTin of the shift resistor SR of the scan IC1 as the control signal DT when the write period is started. Furthermore, the "H" pulse is continuously input to the clock input terminal CKin as the clock signal CK, for example.

In this case, the "L" pulse is sequentially output from the output O1 to On of the shift resistor SR to be applied to the output controllers RG1 to RGn. Accordingly, the switching elements QH1 to QHn are sequentially turned off, and the switching elements QL1 to QLn are sequentially turned on.

As a result, the negative scan pulses are sequentially applied to the scan electrodes SC1 to SCn.

In the sustain period, the control signal C1 attains "H" and the control signal C2 attains "L". Thus, the switching elements QH1 to QHn are turned off and the switching elements QL1 to QLn are turned on. In the state, the sustain pulses are generated by the sustain pulse generator 42. In this case, the sustain pulses are applied to the scan electrodes SC1 to SCn through the switching elements QL1 to QLn.

As described above, paths from the sustain pulse generator 42 to the scan electrodes SC1 to SCn through the switching elements QL1 to QLn are designed such that the large sustain discharge currents caused by the sustain discharges can flow therethrough. On the other hand, other paths are not designed such that the large discharge currents can flow therethrough. Therefore, the continuous flow of the large sustain discharge currents through the switching elements QH1 to QHn may cause the components to be broken, for example.

When such an abnormal operation occurs, the operations of the scan electrode drive circuit 53a and the sustain electrode drive circuit 54 are stopped in the present embodiment. This prevents the components from being broken. Details will be described below.

Note that the high impedance state in which both the control signals C1, C2 attain "L" can be suitably used at a timing where the large currents such as the discharge currents do not flow; for example, at the time of switching the switching elements QH1 to QHn, QL1 to QLn.

(2-4) Configuration of the Plasma Display Device

Figure 22:
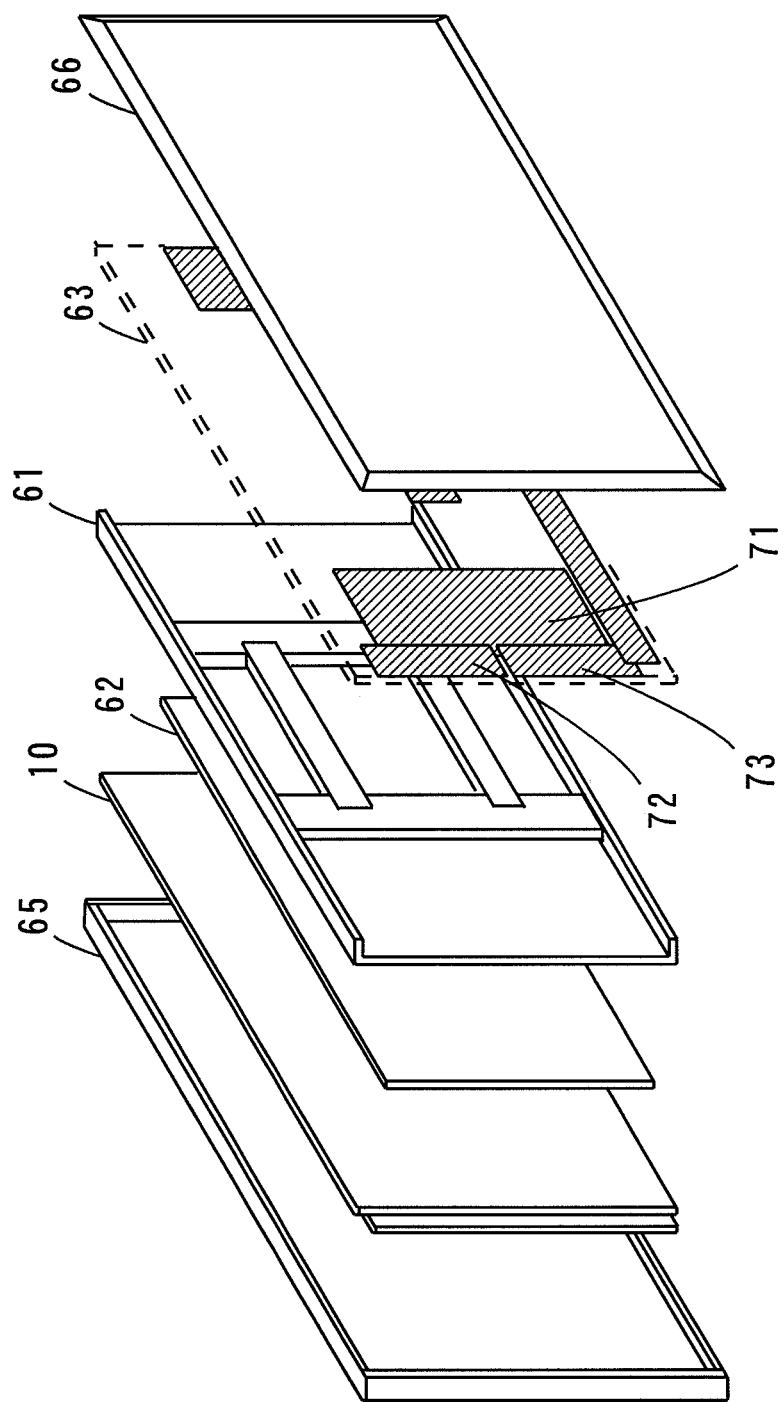
FIG. 22 is an exploded perspective view showing the configuration of the plasma display device according to the embodiment of the present invention.

FIG. 22 is an exploded perspective view showing the configuration of the plasma display device according to the embodiment of the present invention. As shown in FIG. 22, the plasma display device includes a panel 10, a chassis 61, a thermal conductive sheet 62, a circuit block 63, a front frame 65 and a back cover 66.

The panel 10 is held by the chassis 61. Heat generated in the panel 10 is transmitted to the chassis 61 through the thermal conductive sheet 62. The panel 10 and the chassis 61 are bonded to each other using the thermal conductive sheet 62. The circuit block 63 includes the scan electrode drive circuit 53a, the sustain electrode drive circuit 54, the timing generation circuit 55 shown in FIG. 18 and a circuit board having a power supply circuit and so on, not shown, mounted thereon, and drives the panel 10. The panel 10, the chassis 61, the thermal conductive sheet 62 and the circuit block 63 are housed between the front frame 65 and the back cover 66.

The data electrode drive circuit 52, the scan electrode drive circuit 53a and the sustain electrode drive circuit 54 are mounted on the circuit board of the circuit block 63 as described above. Normally, the length of one side of the circuit board that can be used for the plasma display device is about 50 cm at the maximum. In this case, it is difficult to mount the drive circuits on one circuit board. Therefore, the drive circuits are mounted on a plurality of circuit boards.

In the present embodiment, the scan electrode drive circuit 53a is divided to be mounted on three boards, which are a first circuit board 71 and second circuit boards 72, 73. In addition, the control signal monitor circuit 60 shown in FIG. 18 is mounted on the second circuit boards 72, 73.

Figure 23:
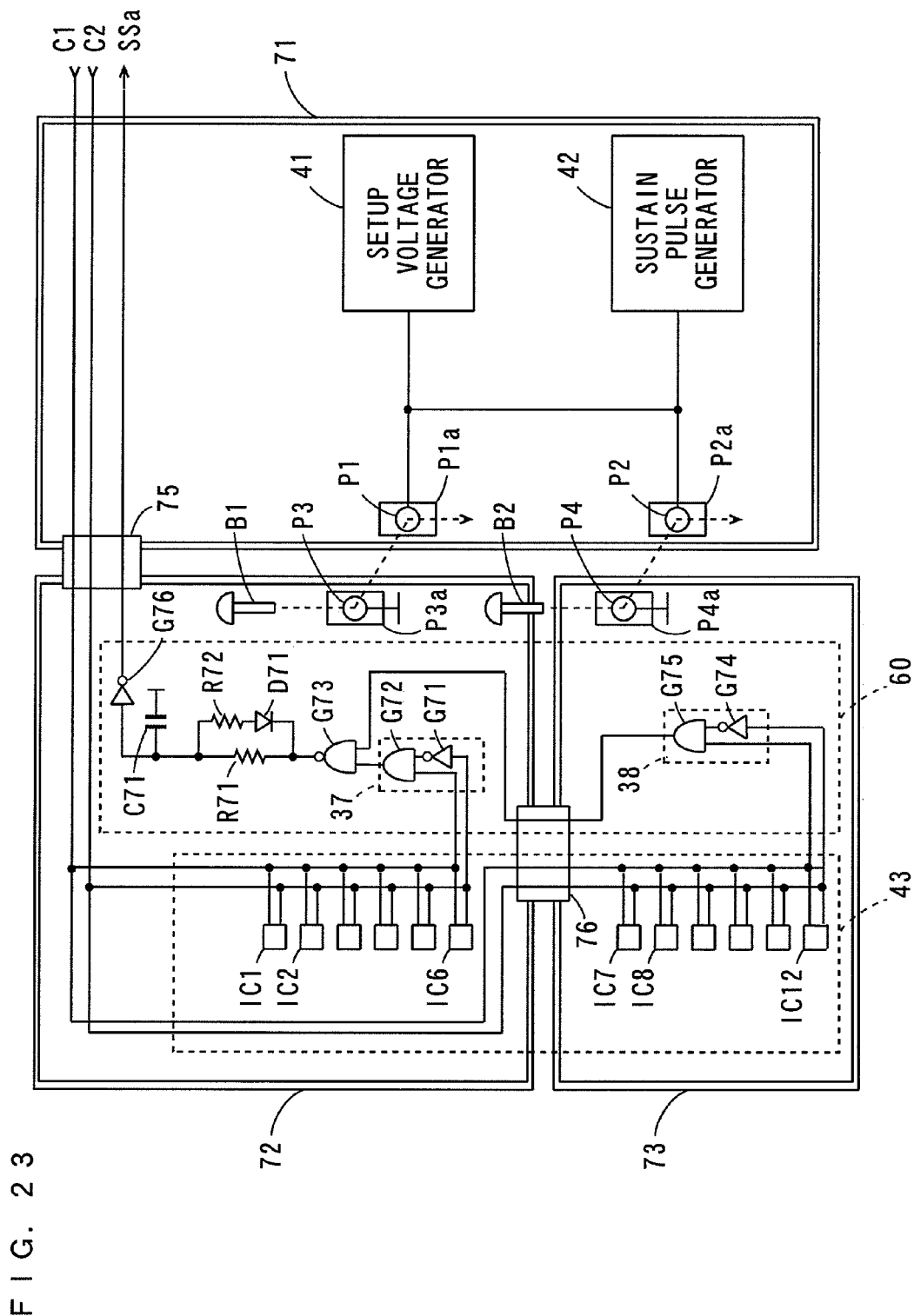
FIG. 23 is a schematic plan view showing the configurations of a first circuit board and a second circuit board.

FIG. 23 is a schematic plan view showing the configurations of the first circuit board 71 and the second circuit boards 72, 73.

In FIG. 23, the setup voltage generator 41 and the sustain pulse generator 42 of the scan electrode drive circuit 53a are mounted on the first circuit board 71. In addition, the scan IC1 to the scan IC6 of the scan pulse generator 43 are mounted on the second circuit board 72, and the scan IC7 to the scan IC12 of the scan pulse generator 43 are mounted on the second circuit board 73. The scan IC1 to the scan IC6 correspond to the scan electrodes SC1 to SC384, and the scan IC7 to the scan IC12 correspond to the scan electrodes SC385 to SC768.

The first circuit board 71 includes input terminals P1, P2, and the second circuit boards 72, 73 include input terminals P3, P4, respectively. The drive voltage waveforms generated by the setup voltage generator 41 and the sustain pulse generator 42 are transmitted from the output terminal P1 of the first circuit board 71 to the input terminal P3 of the second circuit board 72, and transmitted from the output terminal P2 to the input terminal P4 of the second circuit board 73.

The drive voltage waveform transmitted to the input terminal P3 of the second circuit board 72 is applied to the scan electrodes SC1 to SC384 through the scan IC1 to the scan IC6. The drive voltage waveform transmitted to the input terminal P4 of the second circuit board 73 is applied to the scan electrodes SC385 to SC768 through the scan IC7 to the scan IC12.

Here, fittings P1a, P2a are attached to the output terminals P1, P2 of the first circuit board 71, respectively. Fittings P3a, P4a are attached to the input terminals P3, P4 of the second circuit boards 72, 73, respectively. The fitting P1a attached to the output terminal P1 of the first circuit board 71 and the fitting P3a attached to the input terminal P3 of the second circuit board 72 are fastened by a screw B1 while overlapping with each other. In addition, the fitting P2a attached to the output terminal P2 of the first circuit board 71 and the fitting P4a attached to the input terminal P4 of the second circuit board 73 are fastened by a screw B2 while overlapping with each other.

In this case, the impedance of the path from the sustain pulse generator 42 to the scan electrodes SC1 to SCn can be reduced. Accordingly, the large sustain discharge currents can flow from the sustain pulse generator 42 to the scan electrodes SC1 to SCn.

A connector 75 for signal transmission is attached between the first circuit board 71 and the second circuit board 72. A connector 76 for signal transmission is attached between the second circuit boards 72, 73.

The control signals C1, C2 generated by the timing generation circuit 55 (FIG. 18) are transmitted from the first circuit board 71 to the second circuit board 72 through the connector 75, and input to the scan IC1 to the scan IC6. The control signals C1, C2 transmitted to the second circuit board 72 is transmitted to the second circuit board 73 through the connector 76, and input to the scan IC7 to the scan IC12.

While FIG. 23 only shows the control signals C1, C2 of the control signals applied from the timing generation circuit 55 to each scan IC of the scan electrode drive circuit 53a, the other control signals, which are the control signal DT, the clock signal CK and so on, are also applied to each scan IC through the connectors 75, 76. In addition, a buffer circuit, a level shift circuit and so on may be inserted in the transmission path of these control signals.

(2-5) The Control Signal Monitor Circuit

The control signal monitor circuit 60 is divided to be mounted on the second circuit boards 72, 73. The control signal monitor circuit 60 detects that the control signal C1 attains "H" and the control signal C2 attains "L" in the sustain period.

The control signal monitor circuit 60 generates a detection signal SSa based on a detection result. The detection signal SSa is applied to the timing generation circuit 55 (FIG. 18). In the present embodiment, when the control signal monitor circuit 60 generates the detection signal SSa of "L", the timing generation circuit 55 generates a control signal for stopping the operations of the scan electrode drive circuit 53a and the sustain electrode drive circuit 34.

The control signal monitor circuit 60 includes NOT gate circuits G71, G76, an AND gate G72, a NAND gate G73, a diode D71, resistors R71, R72 and a capacitor C71 on the second circuit board 72, and a NOT gate circuit G74 and an AND gate circuit G75 on the second circuit board 73.

An output terminal of the NOT gate circuit G71 and one input terminal of the AND gate circuit G72 are connected to each other on the second circuit board 72. The NOT gate G71 and the AND gate G72 constitute an abnormality detector 37. The control signal C1 transmitted to the second circuit board 72 is applied to the other input terminal of the AND gate circuit G72, and the control signal C2 transmitted to the second circuit board 72 is applied to an input terminal of the NOT gate circuit G71.

An output terminal of the NOT gate circuit G74 and one input terminal of the AND gate circuit G75 are connected to each other on the second circuit board 73. The NOT gate G74 and the AND gate G75 constitute an abnormality detector 38. The control signal C1 transmitted to the second circuit board 73 is applied to the other input terminal of the AND gate circuit G75, and the control signal C2 transmitted to the second circuit board 73 is applied to an input terminal of the NOT gate circuit G74.

An output terminal of the AND gate circuit G72 of the abnormality detector 37 is connected to one input terminal of the NAND gate circuit G73, and an output terminal of the AND gate circuit G75 of the abnormality detector 38 is connected to the other input terminal of the NAND gate circuit G73 through the connector 76.

An output terminal of the NAND gate circuit G73 is connected to an input terminal of the NOT gate circuit G76 through the resistor R71. The resistor R72 and the diode D71 are connected in parallel with the resistor R71 between the output terminal of the NAND gate circuit G73 and the input terminal of the NOT gate circuit G76.

A value of the resistor R71 is set higher than that of the resistor R72. For example, the value of the resistor R71 is set to 100 kΩ and the value of the resistor R72 is set to 1 kΩ. Moreover, the input terminal of the NOT gate circuit G76 is connected to a ground terminal through the capacitor C71.

The detection signal SSa is output from an output terminal of the NOT gate circuit G76. The detection signal SSa is transmitted to the timing generation circuit 55.

When the control signal C1 attains "H" and the control signal C2 attains "L", proper transmission of the control signals C1, C2 to the second circuit boards 72, 73 causes the output signals of the NOT gate circuits G71, G74 to attain "H" and the output signals of the AND gate circuits G72, G75 to attain "H". That is, the output signals of the abnormality detectors 37, 38 attain "H". Accordingly, the output signal of the NAND gate circuit G73 attains "L".

When the control signals C1, C2 are not in the foregoing state, the proper transmission of the control signals C1, C2 to the second circuit boards 72, 73 causes the output signals of the AND gate circuits G72, G75 to attain "L". That is, the output signals of the abnormality detectors 37, 38 attain "L". Accordingly, the output signal of the NAND gate circuit G73 attains "H".

As described above, the control signal C1 attains "H" and the control signal C2 attains "L" in the sustain period. Therefore, the proper transmission of the control signals C1, C2 to the second circuit boards 72, 73 causes the output signal of the NAND gate circuit G73 to attain "L" in the sustain period.

The diode D71, the resistors R71, R72 and the capacitor C71 operate as an integration circuit. When the output signal of the NAND gate circuit G73 is "H", the capacitor C71 is charged. In this case, the current flows through the resistor R71 having a high resistance value, so that a charging speed of the capacitor C71 is relatively late.

When the output signal of the NAND gate circuit G73 attains "L", the capacitor C71 is discharged through the diode D71. In this case, the current flows through the resistor R72 having a low resistance value, so that a discharging speed of the capacitor C71 is relatively fast.

The NOT gate circuit G76 outputs the detection signal SSa of "H" when the voltage of the capacitor C71 is lower than a predetermined threshold value, and outputs the detection signal SSa of "L" when the voltage of the capacitor C71 is not less than the predetermined value.

Figure 24:
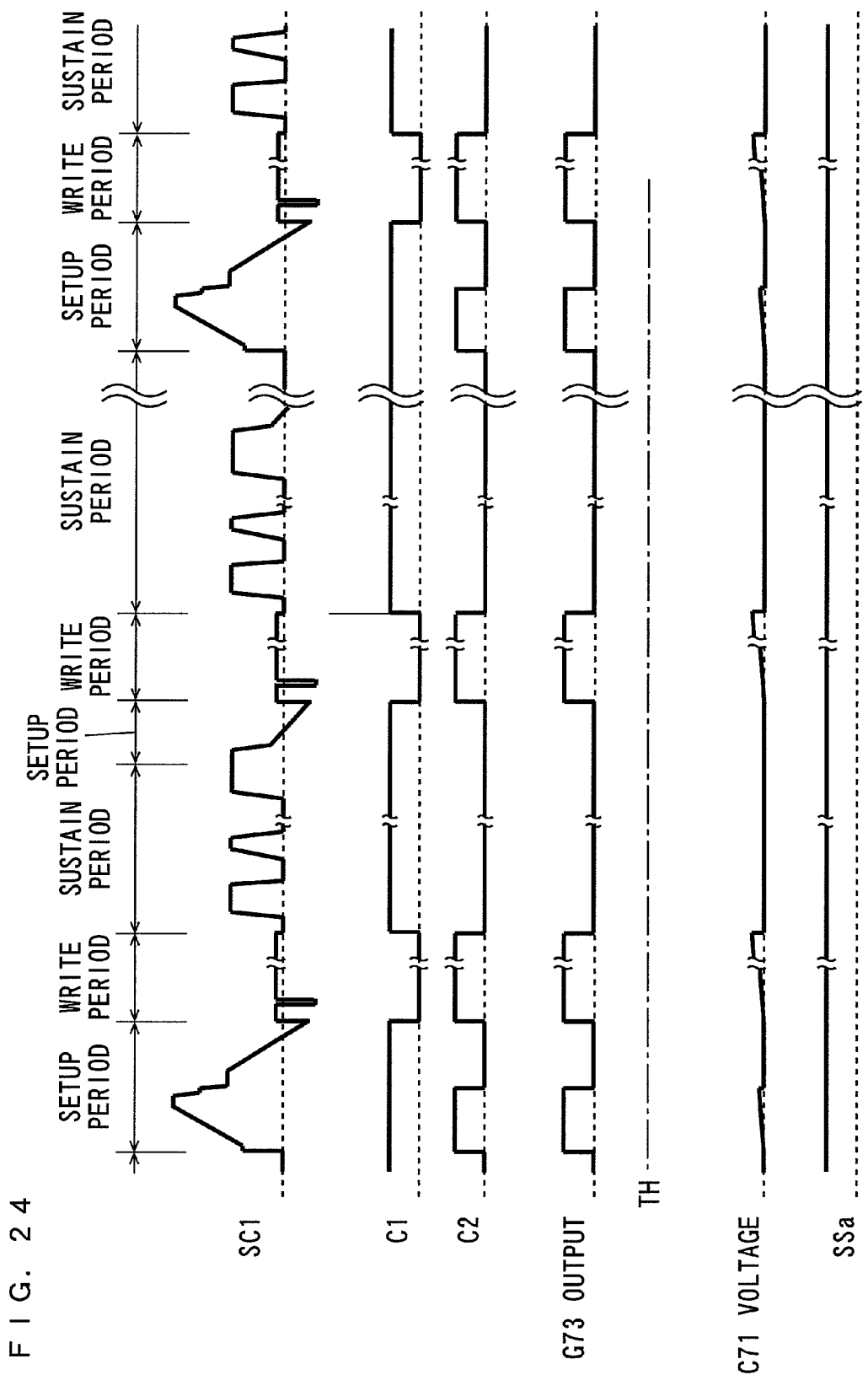
FIG. 24 a diagram for explaining an operation of a control signal monitor circuit.
Figure 25:
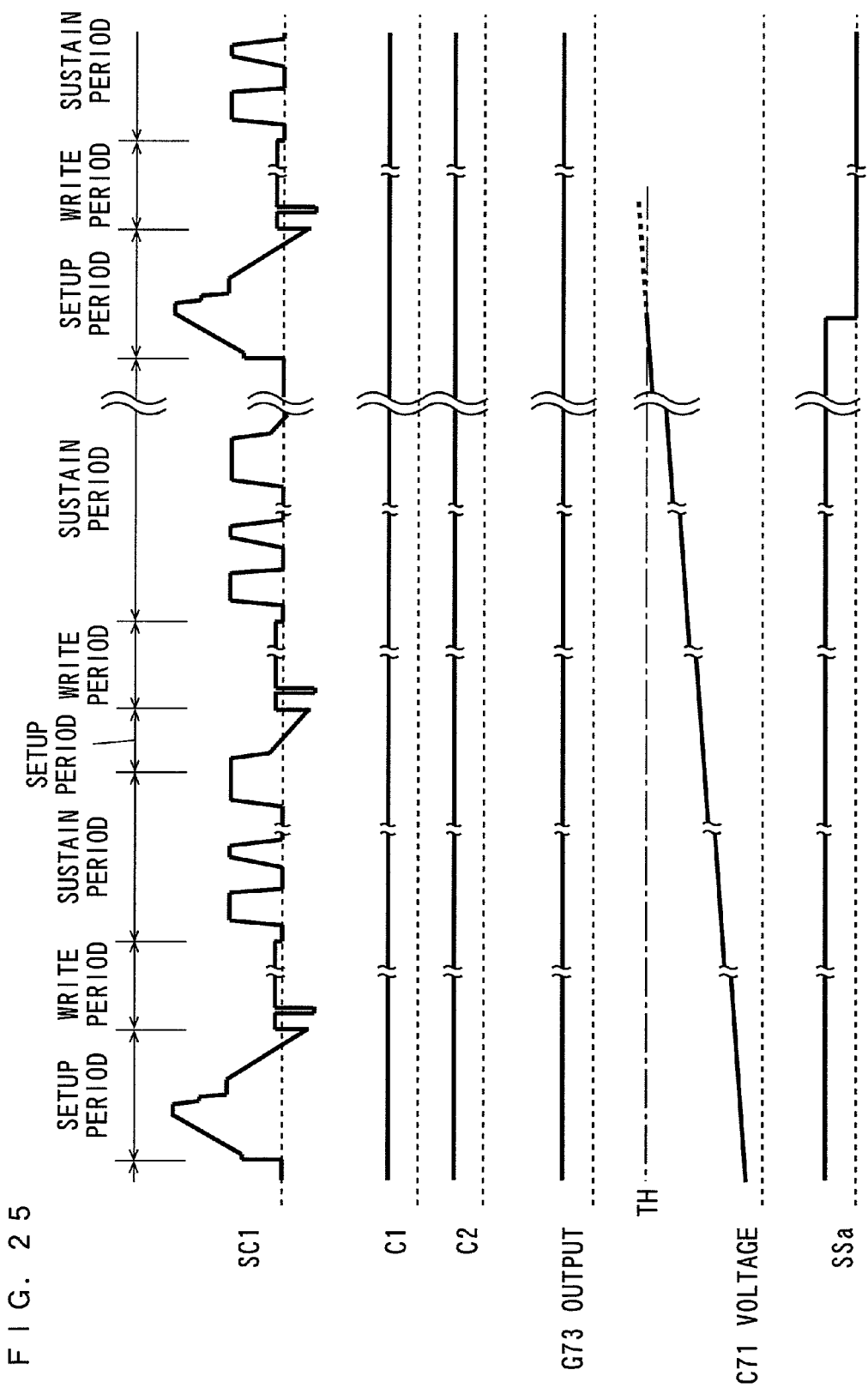
FIG. 25 is a diagram for explaining the operation of the control signal monitor circuit.

FIGS. 24 and 25 are diagrams for explaining the operation of the control signal monitor circuit 60. FIGS. 24 and 25 each show change of the potential of the scan electrode SC1, change of the control signals C1, C2 transmitted to the second circuit boards 72, 73, change of the output signal of the NAND gate circuit G73, change of the voltage of the capacitor C71 and change of the detection signal SSa.

First, description is made of a case where the control signals C1, C2 are properly transmitted to the second circuit boards 72, 73. FIG. 24 shows the operation of the control signal monitor circuit 60 when the control signals C1, C2 are properly transmitted to the second circuit boards 72, 73.

As described above, both the control signals C1, C2 attain "H" in the first half of the setup period in a predetermined sub-field. In the write period, the control signal C1 attains "L" and the control signal C2 attains "H". Thus, the output signal of the NAND gate circuit G73 attains "H", and the capacitor C71 is slowly charged in these periods. This increases the voltage of the capacitor C71.

Since the control signal C1 attains "H" and the control signal C2 attains "L", the output of the NAND gate circuit G73 attains "L" and the capacitor C71 is quickly discharged in the sustain period. This causes the voltage of the capacitor C71 to attain substantially zero.

As described above, the setup period, the write period and the sustain period are periodically repeated, so that the capacitor C71 is regularly discharged. This does not cause the voltage of the capacitor C71 to attain the predetermined threshold value TH or more. Accordingly, the detection signal SSa output from the NOT gate circuit 76 is maintained at "H".

Next, description is made of a case where the control signals C1, C2 are not properly transmitted to the second circuit boards 72, 73.

In the case of poor connection of the connectors 75, 76 or the like, the control signals C1, C2 are not properly transmitted to the second circuit boards 72, 73. For example, each of the control signals C1, C2 is transmitted to the second circuit boards 72, 73 while being fixed to either "H" or "L".

In this case, the switching elements QH1 to QHn of each scan IC are turned on, and the switching elements QL1 to QLn thereof are turned off. As described above, the continuous flow of the large discharge currents through the switching elements QH1 to QHn in the sustain period may cause the components to be broken, for example.

FIG. 25 shows the operation of the control signal monitor circuit 60 when both the control signals C1, C2 are transmitted to the second circuit boards 72, 73 while being fixed to "H".

When both the control signals C1, C2 are fixed to "H", the output signal of the NAND gate circuit G73 always attains "H" in the control signal monitor circuit 60. This causes the voltage of the capacitor C71 to keep increasing. Therefore, the voltage of the capacitor C71 reaches the predetermined threshold value TH, and the detection signal SSa output from the NOT gate circuit G76 attains "L".

When the detection signal SSa attains "L", a control signal generation circuit 35 generates the control signal for stopping the operations of the scan electrode drive circuit 53a and the sustain electrode drive circuit 34 in response. Thus, the operations of the scan electrode drive circuit 53a and the sustain electrode drive circuit 34 are stopped.

This prevents the continuous flow of the large discharge currents through the switching elements QH1 to QHn in the sustain period, preventing the components from being broken. Moreover, the large currents are not generated for stopping a display operation of images, thus more reliably preventing the components from being broken.

Note that the operation of the power supply circuit may be temporality stopped when the detection signal SSa attains "L". Also in the case, the continuous flow of the large discharge currents through the switching elements QH1 to QHn in the sustain period is prevented, thus preventing the components from being broken.

A time period from the time when the voltage of the capacitor C71 starts to increase to the time when it reaches the threshold value TH, that is, a time period from the time when the control signals C1, C2 are fixed to "H" to the time when the detection signal SSa attains "L" is set to 50 ms to 200 ms, for example. The time period can be arbitrarily changed by adjusting the values of the capacitor C71 and the resistor R71 and the setting of the NAND gate circuit G73. It is desirable that the time period is suitably set to an appropriate value according to characteristics of the panel 10, specifications of the plasma display device and so on.

Similarly, it is desirable that other specific numerical values used in the present embodiment are suitably set to appropriate values according to the characteristics of the panel 10, the specification of the plasma display device and so on.

While description is made of the case where the control signals C1, C2 are not properly transmitted to either of the second circuit boards 72, 73 by referring to FIG. 25, the output signal of the NAND gate circuit G73 always attains "H" similarly to the foregoing example when the control signals C1, C2 are not properly transmitted only to the second circuit board 73 because of poor connection of the connector 76, for example. Thus, the detection signal SSa output from the NOT gate circuit G76 attains "L", and the operations of the scan electrode drive circuit 53a and the sustain electrode drive circuit 34 are stopped. That is, the operations of the scan electrode drive circuit 53a and the sustain electrode drive circuit 34 are stopped even when the abnormal operation is generated in either of the second circuit boards 72, 73, so that the components can be prevented from being broken.

(2-6) The Power Supply Abnormality Detection Circuit

The detection signal SSa caused by the control signal monitor circuit 60 can be also used as the abnormality detection signal caused by the voltage abnormality detection circuit that detects the voltage abnormality of the power supply E43 (FIG. 19).

Figure 26:
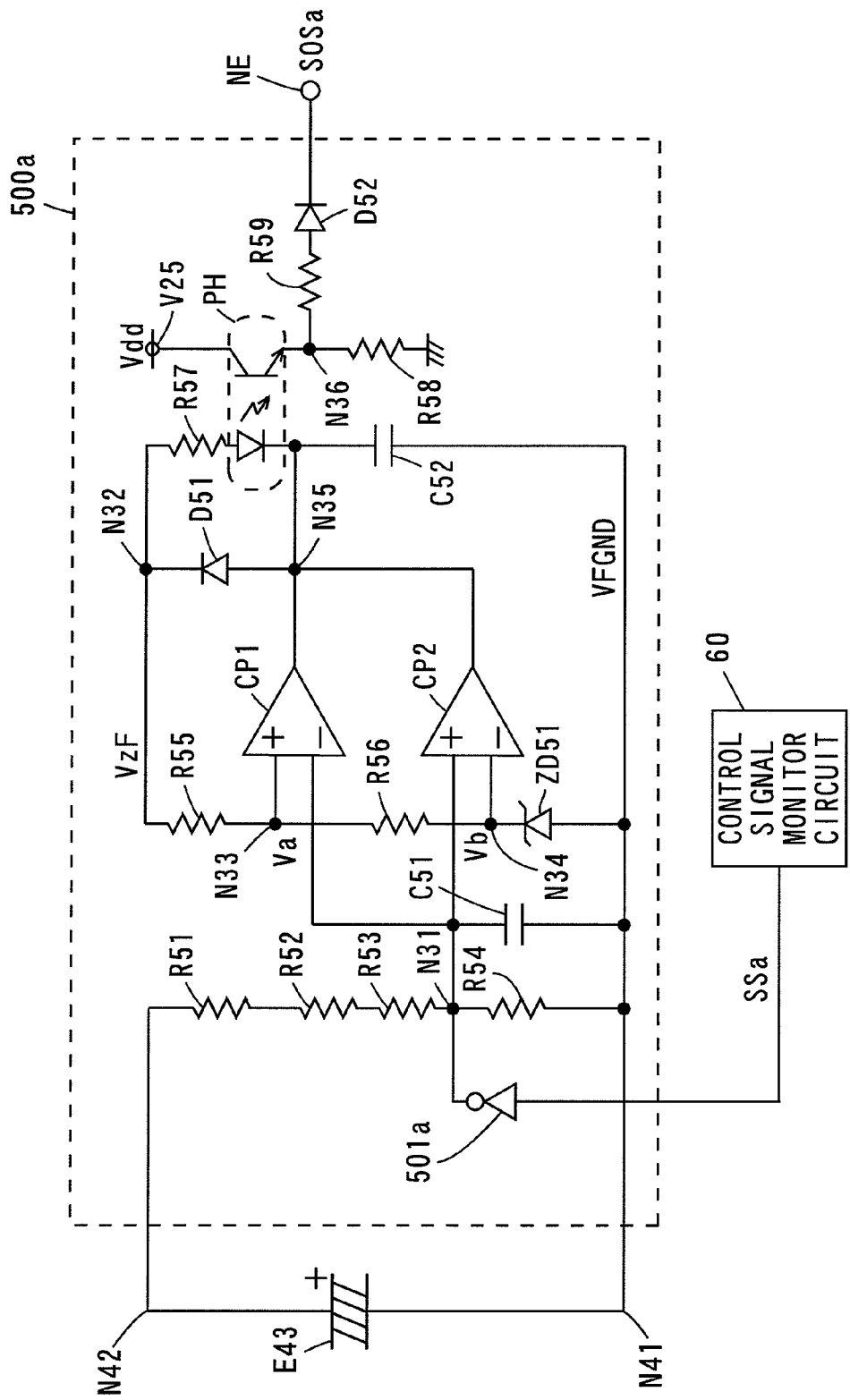
FIG. 26 is a circuit diagram showing the configuration of the voltage abnormality detection circuit.

FIG. 26 is a circuit diagram showing the configuration of the voltage abnormality detection circuit. The voltage abnormality detection circuit 500a of FIG. 26 is described by referring to differences from the voltage abnormality detection circuit 500 of FIG. 17.

As shown in FIG. 26, the voltage abnormality detection circuit 500a is connected between the node N41 and the node N42 of the scan electrode drive circuit 53a. The voltage abnormality detection circuit 500a includes a NOT gate circuit 501a instead of the NAND gate circuit 501 of FIG. 17.

The detection signal SSa output from the NOT gate G76 (FIG. 25) of the control signal monitor circuit 60 is applied to an input terminal of the NOT gate circuit 501a. An output terminal of the NOT gate circuit 501a is connected to the node N31.

When the detection signal SSa of "L" is output from the control signal monitor circuit 60, the output signal of the NOT gate circuit 501a attains "H" and the potential of the node N31 is higher than the potential Va of the node N33 in the voltage abnormality detection circuit 500a. This causes the potential of the output terminal of the comparator CP1 to attain "L". In this case, the current flows through the light emitting diode of the photocoupler PH to cause the light emitting diode to emit light. Thus, the phototransistor of the photocoupler PH is turned on. As a result, the potential of the node N36 is increased, and the abnormality detection signal SOSa of "H" is output from the node NE.

In this manner, the detection signal SSa of the control signal monitor circuit 60 and the abnormality detection signal SOSa of the voltage abnormality detection circuit 500a can be used in common. This reduces the number of the components and the number of assembling steps. As a result, the plasma display device can be reduced in cost.

(3) Correspondences between Elements in the Claims and Parts in Embodiments

In the following paragraphs, non-limiting examples of correspondences between various elements recited in the claims below and those described above with respect to various preferred embodiments of the present invention are explained.

In the foregoing embodiments, the scan electrode drive circuits 53, 53a and the timing generation device 55 are examples of a drive device, the switch circuit 101 or the switching elements QH1 to QHn, QL1 to QLn are examples of a switch circuit, the nodes N1, N41 are examples of a first node, the nodes N2, N42 are examples of a second node, the switching element controller 57 or the logic circuit 110 are examples of a control circuit, the ground terminal and the recovery circuit 400 are examples of a voltage application circuit, and the DC power supply 200 or the power supply E43 is an example of a voltage hold circuit.

The control signals OC1, OC2 are examples of a first control signal, the timing generation circuit 55 is an example of a signal generation circuit, the capacitors 122, 133 are examples of a first capacitive element, the power supply terminal V22 is an example of a first charge circuit, the AND gate circuit 131 is another example of the first charge circuit, the NOR gate circuit 121, the transistor Q11 and the ground terminal G11 are examples of a first discharge circuit, the AND gate circuit 132, the transistor Q13 and the ground terminal G12 are other examples of the first discharge circuit, the power supply terminal V23, the transistor Q12 and the ground terminal G11 are examples of a first signal output circuit, and the power supply terminal V24, the transistor Q14 and the ground terminal G12 are other examples of the first signal output circuit.

The control signals SH, SL are examples of a second control signal, the transistor Q2 is an example of a first switching element, the transistor Q1 is an example of a second switching element, the control signal SL is an example of a first switching signal, the control signal SH is an example of a second switching signal, the capacitor 141 is an example of a second capacitive element, the power supply terminal V21 is an example of a second charge circuit, the transistor Q15 is an example of a second discharge circuit, the transistor Q16 is an example of a second signal output circuit, and the voltage abnormality detection circuit 500 is an example of a voltage detection circuit.

As each of various elements recited in the claims, various other elements having configurations or functions described in the claims can be also used.

INDUSTRIAL APPLICABILITY

The present invention is applicable to a display device that displays various images.

The invention claimed is:

1. A driving device that drives a plasma display panel including a plurality of discharge cells at intersections of a plurality of scan electrodes and a plurality of sustain electrodes with a plurality of data electrodes, comprising:
   a plurality of switch circuits provided corresponding to said plurality of scan electrodes and controlled between a first state in which said plurality of scan electrodes are connected to a first node and a second state in which said plurality of scan electrodes are connected to a second node;
   a control circuit that controls said plurality of switch circuits;
   a voltage application circuit that changes a potential of said first node;
   a voltage hold circuit that holds a voltage between said first node and said second node to a first voltage; and
   a detection circuit that detects an abnormal operation in which at least part of said plurality of switch circuits is fixed in either said first or second state by said control circuit for a predetermined time period or longer.

2. The driving device of the plasma display panel according to claim 1, wherein
   said plasma display panel is driven by a sub-field method in which one field includes a plurality of sub-fields, and
   the device for driving the plasma display panel further includes a sustain pulse generator that generates a sustain pulse to be applied to said plurality of scan electrodes in a sustain period of each sub-field, and
   an operation of said sustain pulse generator is stopped when the abnormal operation is detected by said detection circuit.

3. The driving device of the plasma display panel according to claim 1, wherein
   said plurality of switch circuits are divided to be mounted on a plurality of circuit boards, and
   said detection circuit includes a plurality of abnormality detectors that are provided in said plurality of circuit boards, respectively, and detect abnormal operations of the respective switch circuits mounted on the circuit boards.

4. The driving device of the plasma display panel according to claim 1, further comprising a protective resistor provided between said voltage hold circuit and said second node, wherein
   said detection circuit detects at least part of the plurality of switch circuits being held in said second state for the predetermined time period or longer as said abnormal operation based on a state of a signal in said control circuit.

5. The driving device of the plasma display panel according to claim 4, wherein said predetermined time period is one field period.

6. The driving device of the plasma display panel according to claim 1, further comprising a signal generation circuit that generates a first control signal, wherein
said control circuit controls said plurality of switch circuits in response to said first control signal generated by said signal generation circuit, and
said detection circuit detects said abnormal operation based on a state of said first control signal as said state of the signal.

7. The driving device of the plasma display panel according to claim 6, wherein
said control circuit controls said plurality of switch circuits to be in said first state when said first control signal is a first logic, and controls said plurality of switch circuits to be in said second state when said first control signal is a second logic, and
said detection circuit outputs an abnormality detection signal indicating an occurrence of said abnormal operation when said first control signal continues to be said second logic for said predetermined time period or longer.

8. The driving device of the plasma display panel according to claim 7, wherein
said detection circuit includes
a first capacitive element,
a first charge circuit that causes said first capacitive element to be charged at a constant time constant when said first control signal is said second logic,
a first discharge circuit that causes said first capacitive element to be discharged when said first control signal is not said second logic, and
a first signal output circuit that outputs said abnormality detection signal when a charging voltage of said first capacitive element is larger than a predetermined value.

9. The driving device of the plasma display panel according to claim 1, wherein
said control circuit generates a second control signal for controlling said plurality of switch circuits, and
said detection circuit detects said abnormal operation based on a state of said second control signal as said state of the signal.

10. The driving device of the plasma display panel according to claim 9, wherein
said plurality of switch circuits include first switching elements connected between said scan electrodes corresponding to said plurality of switch circuits, respectively, and said first node, and second switching elements connected between said scan electrodes corresponding to said plurality of switch circuits, respectively, and said second node,
said control circuit generates a first switching signal for controlling ON/OFF of said plurality of first switching elements and a second switching signal for controlling ON/OFF of said plurality of second switching elements as second control signals, and
said detection circuit outputs an abnormality detection signal indicating an occurrence of said abnormal operation of said switch circuits based on said first switching signal when said first switching element is not turned on within said predetermined time period.

11. The driving device of the plasma display panel according to claim 10, wherein said detection circuit includes
a second capacitive element,
a second charge circuit that causes said second capacitive element to be charged at a constant time constant when said first switching element is turned off,
a second discharge circuit that causes said second capacitive element to be discharged when said first switching element is turned on, and
a second signal output circuit that outputs said abnormality detection signal when a charging voltage of said second capacitive element is larger than a predetermined value.

12. The driving device of the plasma display panel according to claim 1, further comprising
a voltage detection circuit that detects that the voltage held by said voltage hold circuit exceeds an allowable value, wherein
said voltage detection circuit outputs a common detection signal when the voltage held by said voltage hold circuit exceeds the allowable value or when an occurrence of the abnormal operation of at least part of said plurality of switch circuits is detected by said detection circuit.

13. A driving method of a plasma display panel including a plurality of discharge cells at intersections of a plurality of scan electrodes and a plurality of sustain electrodes with a plurality of data electrodes, comprising the steps of:
holding a voltage between a first node and a second node to a first voltage by a voltage hold circuit;
changing a potential of said first node by a voltage application circuit;
controlling a plurality of switch circuits provided corresponding to said plurality of scan electrodes between a first state in which said plurality of scan electrodes are connected to a first node and a second state in which said plurality of scan electrodes are connected to a second node by a control circuit; and
detecting an abnormal operation in which at least part of said plurality of switch circuits is fixed in either said first or second state by said control circuit for a predetermined time period or longer.

14. A plasma display device comprising:
a plasma display panel including a plurality of discharge cells at intersections of a plurality of scan electrodes and a plurality of sustain electrodes with a plurality of data electrodes, and
a driving device that drives said plurality of scan electrodes of said plasma display panel, wherein
said driving device includes
a plurality of switch circuits provided corresponding to said plurality of scan electrodes and controlled between a first state in which said plurality of scan electrodes are connected to a first node and a second state in which said plurality of scan electrodes are connected to a second node;
a control circuit that controls said plurality of switch circuits;
a voltage application circuit that changes a potential of said first node;
a voltage hold circuit that holds a voltage between said first node and said second node to a first voltage; and
a detection circuit that detects an abnormal operation in which at least part of said plurality of switch circuits is fixed in either said first or second state by said control circuit for a predetermined time period or longer.

* * * * *